US009213637B1

(12) United States Patent
Karamcheti et al.

(10) Patent No.: US 9,213,637 B1
(45) Date of Patent: *Dec. 15, 2015

(54) READ AND WRITE PERFORMANCE FOR NON-VOLATILE MEMORY

(71) Applicant: Virdent Systems, Inc., San Jose, CA (US)

(72) Inventors: Vijay Karamcheti, Palo Alto, CA (US); Shibabrata Mondal, Bangalore (IN); Ajith Kumar, Bangalore (IN)

(73) Assignee: Virident Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,345

(22) Filed: Feb. 3, 2015

Related U.S. Application Data

(60) Continuation of application No. 13/162,575, filed on Jun. 16, 2011, now Pat. No. 8,949,555, which is a continuation-in-part of application No. 12/831,233, filed on Jul. 6, 2010, now Pat. No. 8,370,547, and a continuation-in-part of application No. 12/369,725, filed on Feb. 11, 2009, now Pat. No. 8,806,116, said application No. 12/831,233 is a division of application No. 11/847,986, filed on Aug. 30, 2007, now Pat. No. 7,761,623.

(60) Provisional application No. 61/356,651, filed on Jun. 20, 2010, provisional application No. 61/356,640, filed on Jun. 20, 2010, provisional application No. 61/356,406, filed on Jun. 18, 2010.

(51) Int. Cl.
*G06F 3/06* (2006.01)
*G06F 12/02* (2006.01)
*G06F 13/16* (2006.01)
*G06F 13/18* (2006.01)
*G06F 12/06* (2006.01)

(52) U.S. Cl.
CPC ........ *G06F 12/0253* (2013.01); *G06F 12/0246* (2013.01); *G06F 3/0659* (2013.01); *G06F 12/06* (2013.01); *G06F 13/161* (2013.01); *G06F 13/1626* (2013.01); *G06F 13/1642* (2013.01); *G06F 13/18* (2013.01); *G06F 2212/702* (2013.01); *G06F 2212/7205* (2013.01)

(58) Field of Classification Search
None
See application file for complete search history.

(56) References Cited

U.S. PATENT DOCUMENTS 5,210,872 A * 5/1993 Ferguson et al. ............. 718/102
5,495,457 A * 2/1996 Takagi .......................... 711/118

(Continued)

*Primary Examiner* — Edward Dudek, Jr.
*Assistant Examiner* — Christopher D Birkhimer
(74) *Attorney, Agent, or Firm* — Alford Law Group, Inc.; Tobi Clinton

(57) ABSTRACT

In one embodiment of the invention, a memory system includes non-volatile-memory-devices (NVMDs) coupled to memory channels to share busses and a memory controller coupled to the memory channels in communication between the plurality of NVMDs. Each NVMD independently executes a read, write, or erase operation at a time. The memory controller includes channel schedulers to schedule control and data transfers associated with the read, write, and erase operations on the memory channels; and high priority and low priority queues coupled to the channel schedulers. The channel schedulers prioritize operations waiting in the high priority queues over operations waiting in the low priority queues. The channel schedulers further prioritize read operations waiting in either the high priority queue or the low priority queue over write and erase operations waiting in each respective queue.

6 Claims, 16 Drawing Sheets

(56) References Cited

U.S. PATENT DOCUMENTS

| | | | |
|---|---|---|---|
| 5,551,003 A * | 8/1996 | Mattson et al. | 711/136 |
| 6,594,749 B1 * | 7/2003 | Czajkowski | 711/170 |
| 6,629,113 B1 * | 9/2003 | Lawrence | 1/1 |
| 6,874,074 B1 * | 3/2005 | Burton et al. | 711/170 |
| 6,961,740 B2 * | 11/2005 | O'Connor et al. | 1/1 |
| 7,409,489 B2 * | 8/2008 | Sinclair | 711/103 |
| 2002/0032691 A1 * | 3/2002 | Rabii et al. | 707/200 |
| 2002/0069280 A1 * | 6/2002 | Bolik et al. | 709/225 |
| 2002/0091904 A1 * | 7/2002 | Haggar et al. | 711/170 |
| 2004/0060041 A1 * | 3/2004 | Demsey et al. | 717/151 |
| 2004/0158589 A1 * | 8/2004 | Liang et al. | 707/206 |
| 2004/0193828 A1 * | 9/2004 | Nevill | 711/170 |
| 2004/0267982 A1 * | 12/2004 | Jackson et al. | 710/52 |
| 2005/0088771 A1 * | 4/2005 | Jaquette et al. | 360/73.04 |
| 2005/0204187 A1 * | 9/2005 | Lee et al. | 714/8 |
| 2005/0273568 A1 * | 12/2005 | Blandy | 711/170 |
| 2006/0161728 A1 * | 7/2006 | Bennett et al. | 711/103 |
| 2006/0259528 A1 * | 11/2006 | Dussud et al. | 707/206 |
| 2007/0174579 A1 * | 7/2007 | Shin | 711/170 |
| 2008/0172431 A1 * | 7/2008 | Stephens et al. | 707/206 |

* cited by examiner

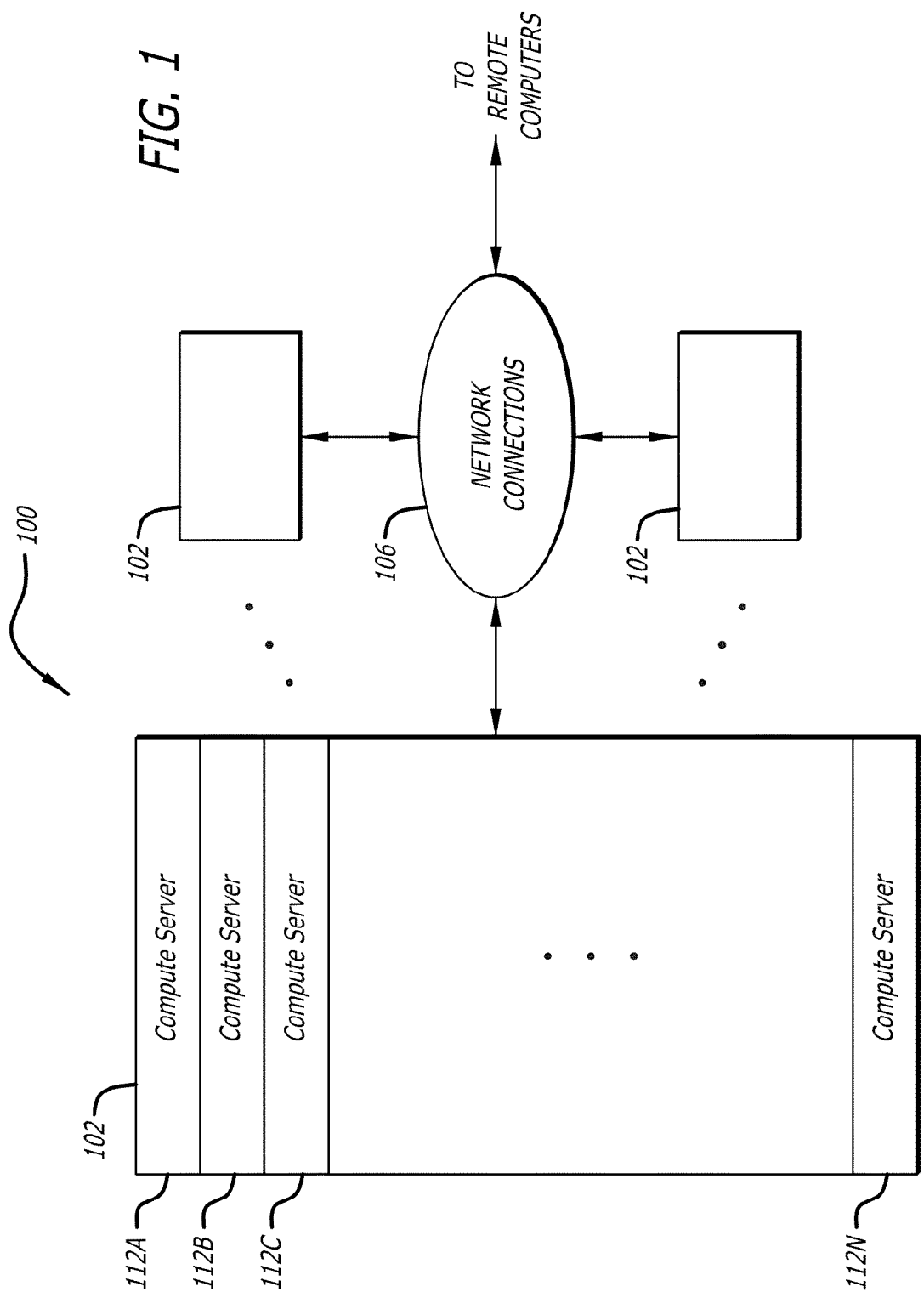

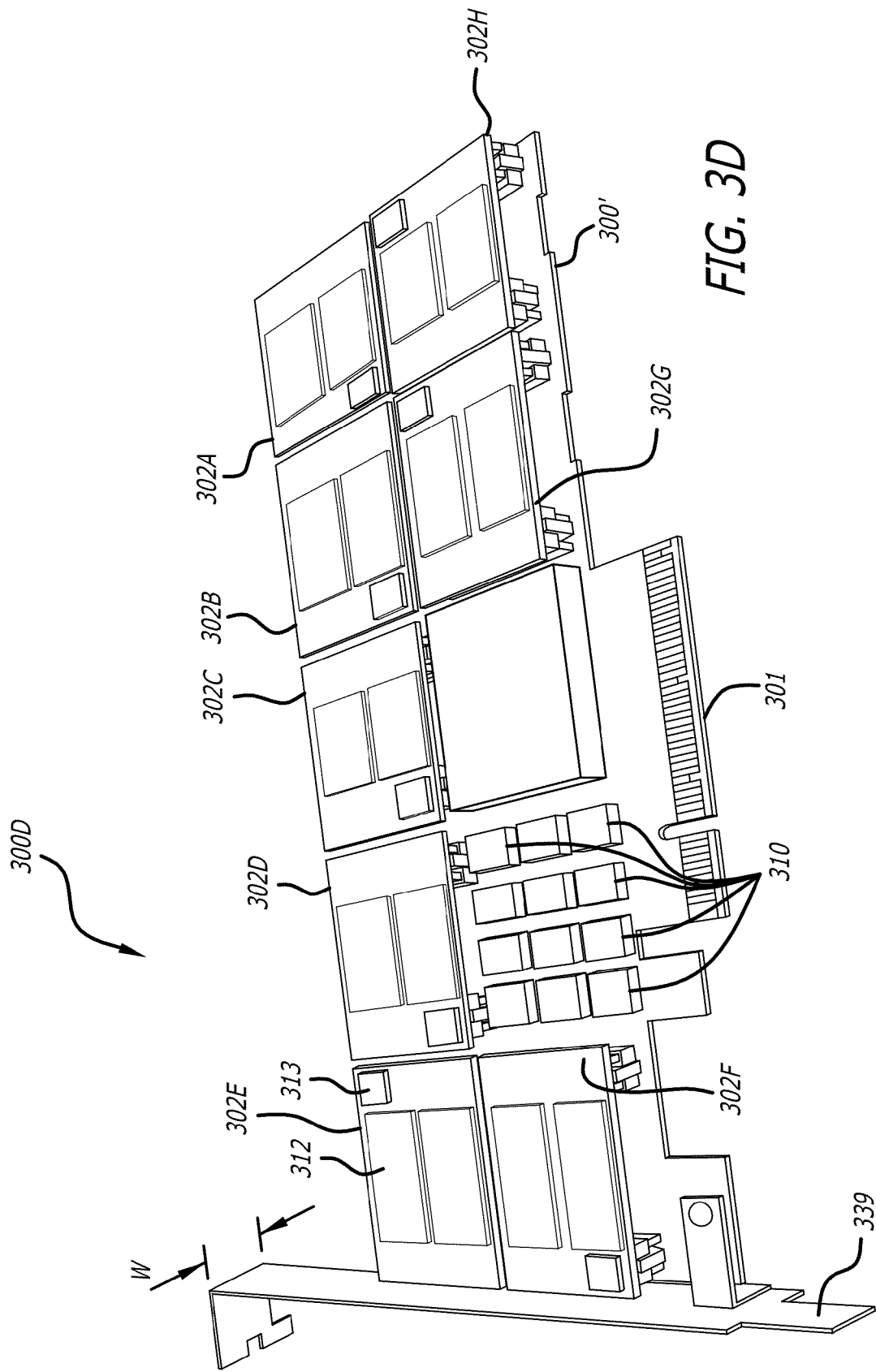

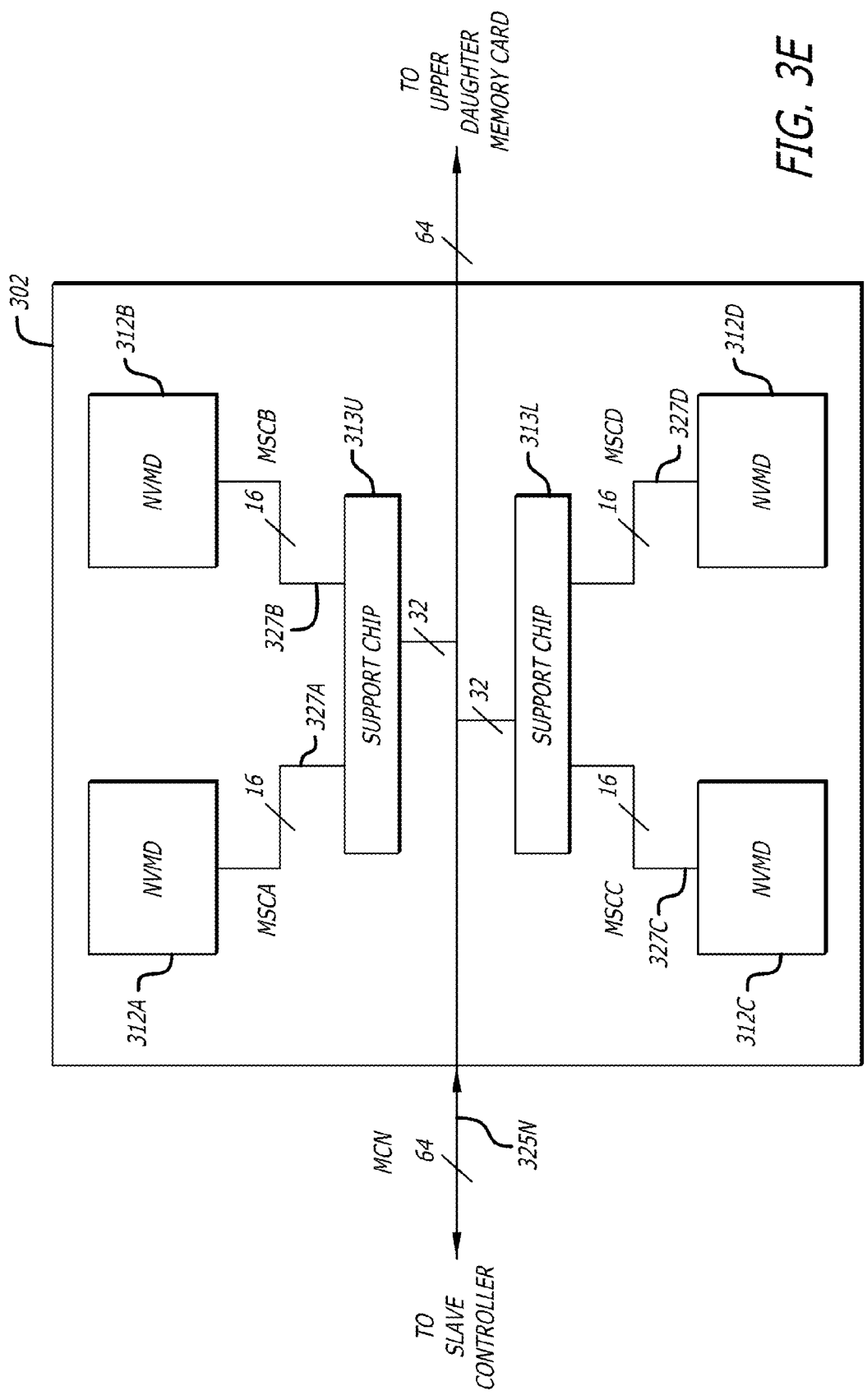

READ AND WRITE PERFORMANCE FOR NON-VOLATILE MEMORY

CROSS-REFERENCE TO RELATED APPLICATIONS

This United States (U.S.) patent application is a continuation application that claims the benefit of U.S. patent application Ser. No. 13/162,575 entitled METHODS FOR SUSTAINED READ AND WRITE PERFORMANCE WITH NON-VOLATILE MEMORY filed on Jun. 16, 2011 by inventors Vijay Karamcheti et al., now allowed.

U.S. patent application Ser. No. 13/162,575 claims the benefit of U.S. Patent Application No. 61/356,651 entitled SUSTAINED READ AND WRITE PERFORMANCE FOR NON-VOLATILE MEMORY filed on Jun. 20, 2010 by inventors Vijay Karamcheti et al.; U.S. Patent Application No. 61/356,640 entitled MEMORY APPARATUS AND METHODS THEREOF FOR EARLY WRITE TERMINATION AND POWER FAILURE filed on Jun. 20, 2010 by inventors Vijay Karamcheti et al.; and U.S. Patent Application No. 61/356,406 entitled METHODS AND MEMORY APPARATUS FOR REPLACEABLE NON-VOLATILE MEMORY filed on Jun. 18, 2010 by inventors Ruban Kanapathippillai et al., all of which are incorporated herein by reference in their entirety.

U.S. patent application Ser. No. 13/162,575 is a continuation in part claiming the benefit of U.S. patent application Ser. No. 12/831,233 entitled SYSTEM AND APPARATUS WITH A MEMORY CONTROLLER CONFIGURED TO CONTROL ACCESS TO RANDOMLY ACCESSIBLE NON-VOLATILE MEMORY filed on Jul. 6, 2010 by inventors Vijay Karamcheti et al., now issued as U.S. Pat. No. 8,370,547; and is a continuation in part claiming the benefit of U.S. patent application Ser. No. 12/369,725 entitled MEMORY MODULES FOR TWO-DIMENSIONAL MAIN MEMORY filed on Feb. 11, 2009 by inventors Vijay Karamcheti et al., now issued as U.S. Pat. No. 8,806,116, all of which are incorporated herein by reference in their entirety.

U.S. patent application Ser. No. 12/831,233 is a divisional of U.S. patent application Ser. No. 11/847,986 entitled MAIN MEMORY IN A SYSTEM WITH A MEMORY CONTROLLER CONFIGURED TO CONTROL ACCESS TO NON-VOLATILE MEMORY, AND RELATED TECHNOLOGIES filed on Aug. 30, 2007 by inventors Vijay Karamcheti et al., now issued as U.S. Pat. No. 7,761,623.

FIELD

The embodiments of the invention relate generally to non-volatile memory.

BACKGROUND

Computer systems often include dynamic random access memory (DRAM) integrated circuits (ICs) and magnetic storage disks as part of their read/writeable storage subsystem. DRAM supports high-performance random access at small block granularity (e.g., 8 bit bytes), but is limited in its capacity, consumes power, and is volatile (i.e., information stored there is lost if power goes out). On the other hand, magnetic storage disks have larger capacity and are non-volatile, but deliver poor data access performance.

Consequently, the overall performance of a single server with DRAM and hard disks is limited, requiring multiple servers and higher operating costs to meet the performance demands of application workloads.

It is desirable to reduce server count and operating costs by increasing the performance of a single server by providing alternatives to DRAM and magnetic disks in the read/writeable storage subsystem of computer systems.

BRIEF SUMMARY

Aspects of embodiments of the invention are summarized by the claims that follow below.

BRIEF DESCRIPTIONS OF THE DRAWINGS

FIG. 1 is a block diagram of a server center.

FIG. 3D is a perspective view of a pluggable server memory card with a single level of replaceable pluggable daughter-memory-cards.

FIG. 3E is a block diagram of a pluggable daughter-memory-card that may plugged into the server memory card.

DETAILED DESCRIPTION

Figure 2A:
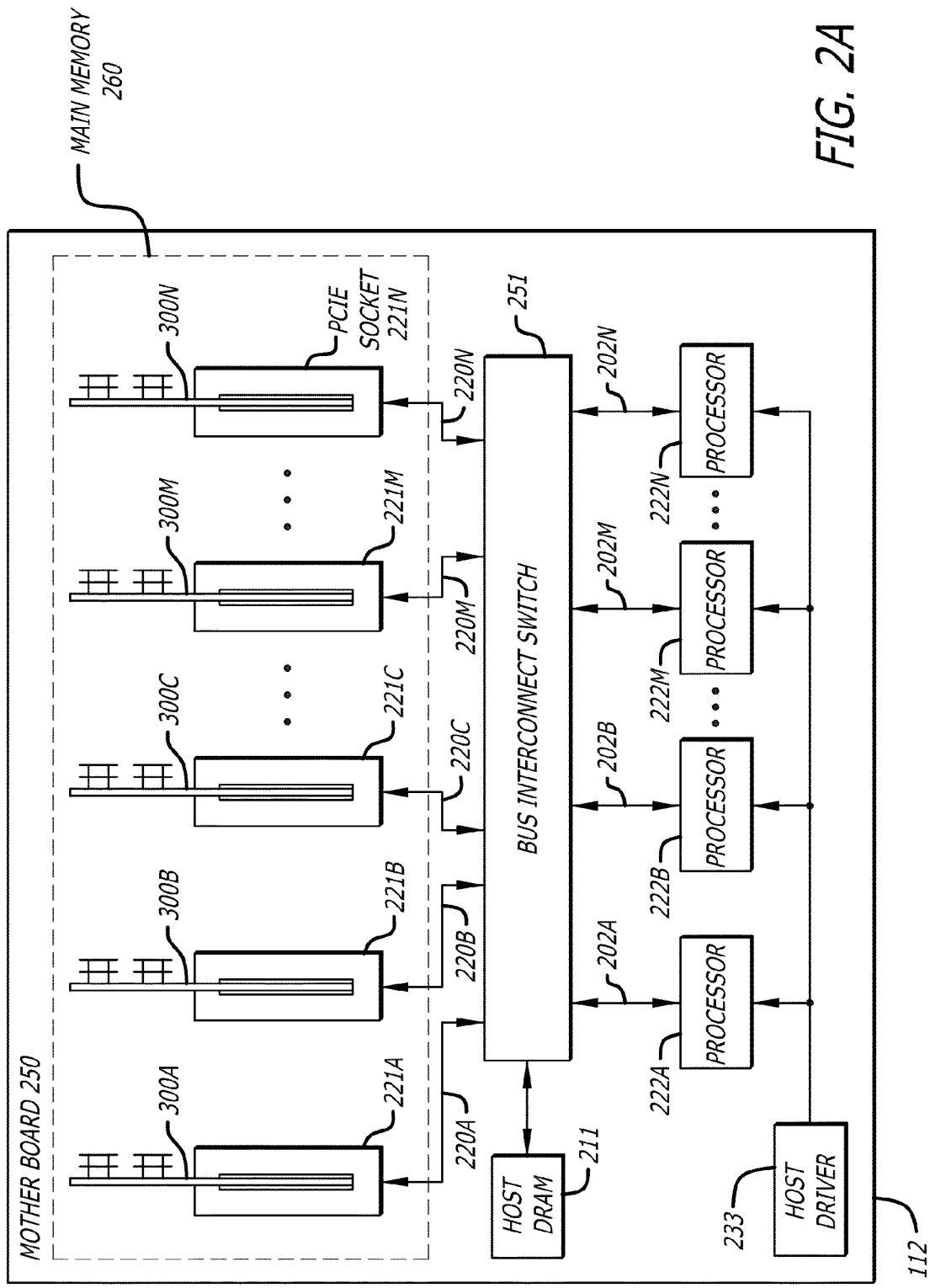
FIG. 2A is a block diagram of a server system.

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The technologies used by non-volatile memory integrated circuits differ from dynamic random access memory (DRAM) integrated circuits (ICs) in the structure of their memory cell and in how they store information within the cell. These differences may help a computer system achieve relatively low power consumption characteristics. For example, non-volatile memory integrated circuits typically do not require refresh cycles and thus conserve power. Non-volatile memory integrated circuits, because of their increased density and high read and write performance, may help expand the capacity of main memory in the system. Alternately or in addition, non-volatile memory integrated circuits, by virtue of their ability to persist information across power cycling of the computer system, may help improve the I/O performance of disk-based storage systems.

Non-volatile memory integrated circuits possess characteristics that allow them to augment, and in some cases replace DRAM and storage disks in a storage subsystem of a computer system. Some types of non-volatile memory circuits, such as NAND Flash integrated circuits, can be configured as storage devices that offer disk-like non-volatility and capacity, with DRAM-like read and write access performance. Delivering the same performance, some types of non-volatile memory circuits may utilize less space and consume less power.

Typically, read and write accesses to non-volatile memory integrated circuits may take more time than corresponding accesses to DRAM integrated circuits. In order to address differences between read and write performance and the access characteristics, a data communication protocol may be used that accesses the non-volatile memory modules in a different manner than DRAM memory modules. Data may be first loaded into a DRAM staging area before being written into some types of non-volatile memory and accessed by application software running on the processing unit of the computer system. Some types of non-volatile memory may also have data stored into the DRAM staging area before being written in block form into the non-volatile memory integrated circuits.

Low Power Server System

Referring now to FIG. 1, a block diagram of a server system 100 is illustrated including one or more low power server racks 102 coupled to a wide area network (e.g., internet) or local area network through network connections 106. The server system 100 may couple to remote computers through the network connections. The low power server rack 102 includes one or more low power compute servers 112A-112N each of which can store and process data in a low power main memory incorporating non-volatile memory devices.

With additional servers being made available on the internet to provide web based applications and web based storage and searches, a lower power server rack incorporating non-volatile memory devices may lower power consumption and reduce operating costs of a server system.

Figure 2B:
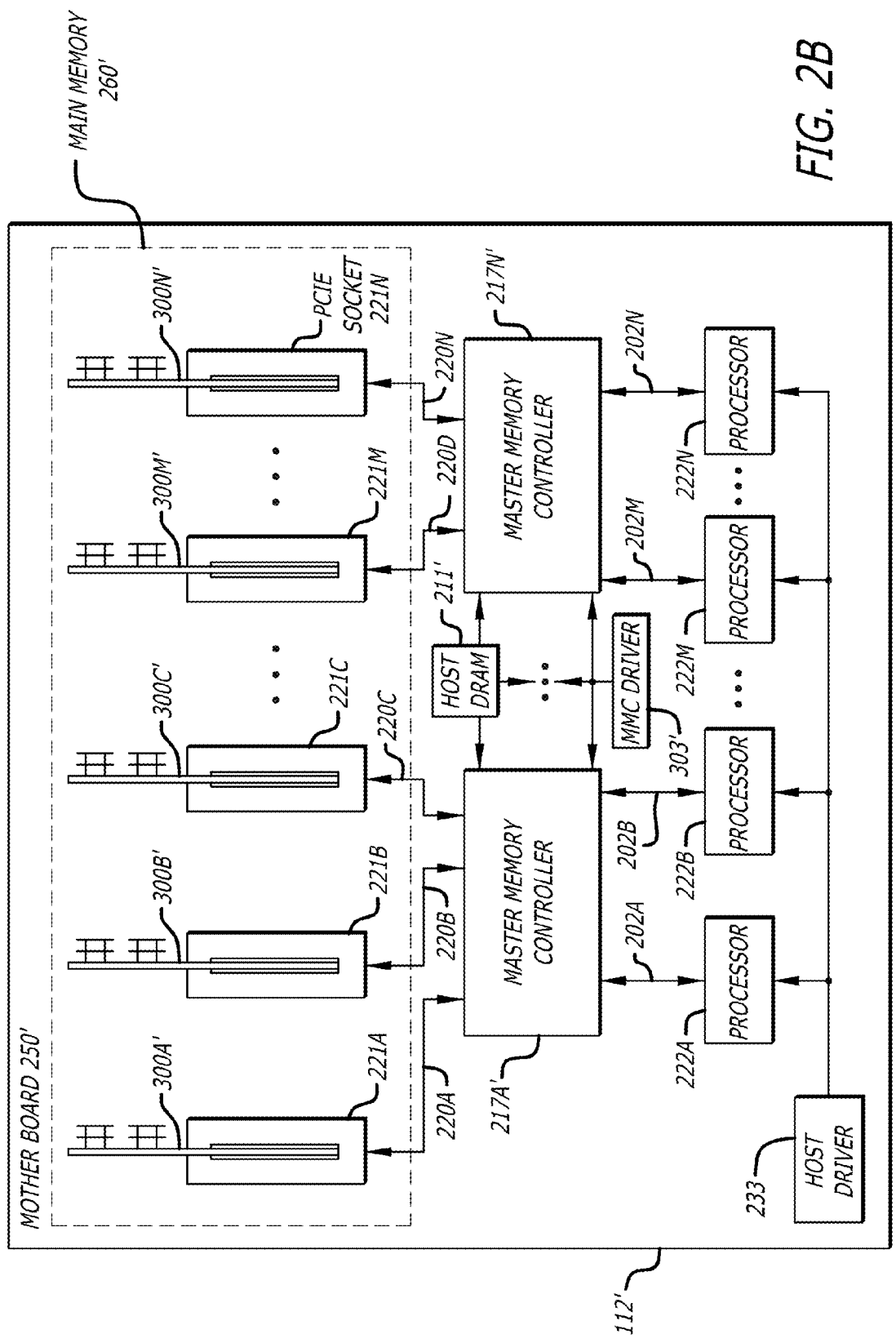
FIG. 2B is a block diagram of an alternate server system.

Referring now to FIG. 2A, a block diagram of a low power compute server 112 is illustrated as an instance of one of the low power compute servers 112A-112N of the server rack. FIG. 2B, illustrates a block diagram of an alternate low power compute server 112' as an instance of one of the low power compute servers 112A-112N of the server rack.

The compute server 112,112' includes a main memory 260,260' with one or more replaceable low power server memory cards (SMC) 300A-300N, 300A'-300N' each having non-volatile random access memory (NVRAM). A server memory card (SMC) may also be referred to as a slot card memory (SCM). NVRAM that is randomly accessible and can be re-written and erased, in contrast to read only memory (ROM) that can only be read and not re-written, may generally be referred to herein as non-volatile memory. When implemented with NAND flash memory, the NVRAM is block accessible using a block based flash memory interface.

The compute server 112,112' includes a multilayer mother printed circuit board 250,250' (also referred to as a "mother board") with one or more layers of wire interconnect or traces, such as traces 202A-202N and 220A-220N, to connect components of the server in communication with each other as shown. The traces of the motherboard connect the various processors, memory, and I/O together on the motherboard. To receive an edge connector of each of the one or more replaceable low power server memory cards (SMC) 300A-300N, 300A'-300N', the motherboard 250,250' includes one or more expansion connectors or sockets 221A-221N. In one embodiment of the invention, the edge connector of the server memory cards (SMC) 300A-300N, 300A'-300N' is a peripheral component interconnect express (PCIe) edge connector and each of the sockets 221A-221N is a PCIe socket.

The compute server 112,112' may be a multiprocessor server with a plurality of processors 222A-222N mounted to the mother board 250 each of which may be in communication with a host software driver that may be stored in a storage device 233. In the compute server 112 illustrated in FIG. 2A, memory controllers (master memory controllers 217,217' and slave memory controllers 402A-402B shown in FIG. 4) are included as part of the server memory cards 300A-300N. However, the compute server 112' illustrated in FIG. 2B may include one or more master memory controllers 217A'-217N' mounted to the mother board and coupled to the plurality of processors 222A-222N by traces 202A-202N and a host dynamic random access memory (DRAM) 211' by additional printed circuit board traces. The memory controllers 217A'-217N' couple to the sockets 221A-221N by the traces 220A-220N that may be referred to as primary or master memory channels 220A-220N. The memory controllers 217A'-217N' are primary or master memory controllers to respectively control one or more of the primary or master memory channels 220A-220N. Alternatively, one or more master memory controllers 217,217' may be located on each of the one or more replaceable low power server memory cards (SMC) 300A-300N. A bus interconnect switch 251 illustrated in FIG. 2A may be mounted to the motherboard and coupled to printed circuit board (PCB) traces 220A-220N,202A-202N between the one or more processors 222A-222N and each of the sockets 221A-221N. The host dynamic random access memory (DRAM) 211 may be coupled to the PCB traces that are further coupled to the bus interconnect switch 251. Secondary memory controllers or slave memory controllers may couple to the master memory controllers and control each memory channel.

The master memory controllers and/or the slave memory controllers may be software programmable memory controllers that can adapt on the fly, prior to memory access, to different types and capacities of memory. A master memory controller driver 303 (see MMC driver 303' in FIG. 2B) in communication with each of the master memory controllers 217A'-217N' may be used to initialize the memory controllers and execute a number of program instructions to provide support services to each of the server memory cards (SMC) 300A'-300N'. Alternatively, the master memory controller driver 303 may be stored in a read only memory (see ROM 423 in FIG. 4) and communicated to each of the one or more master memory controllers 217,217' to initialize the memory controllers and execute a number of program instructions to provide support services to each of the server memory cards (SMC) 300A-300N shown in FIG. 2A.

Low Power Server Memory Card (SMC)

Figure 3A:
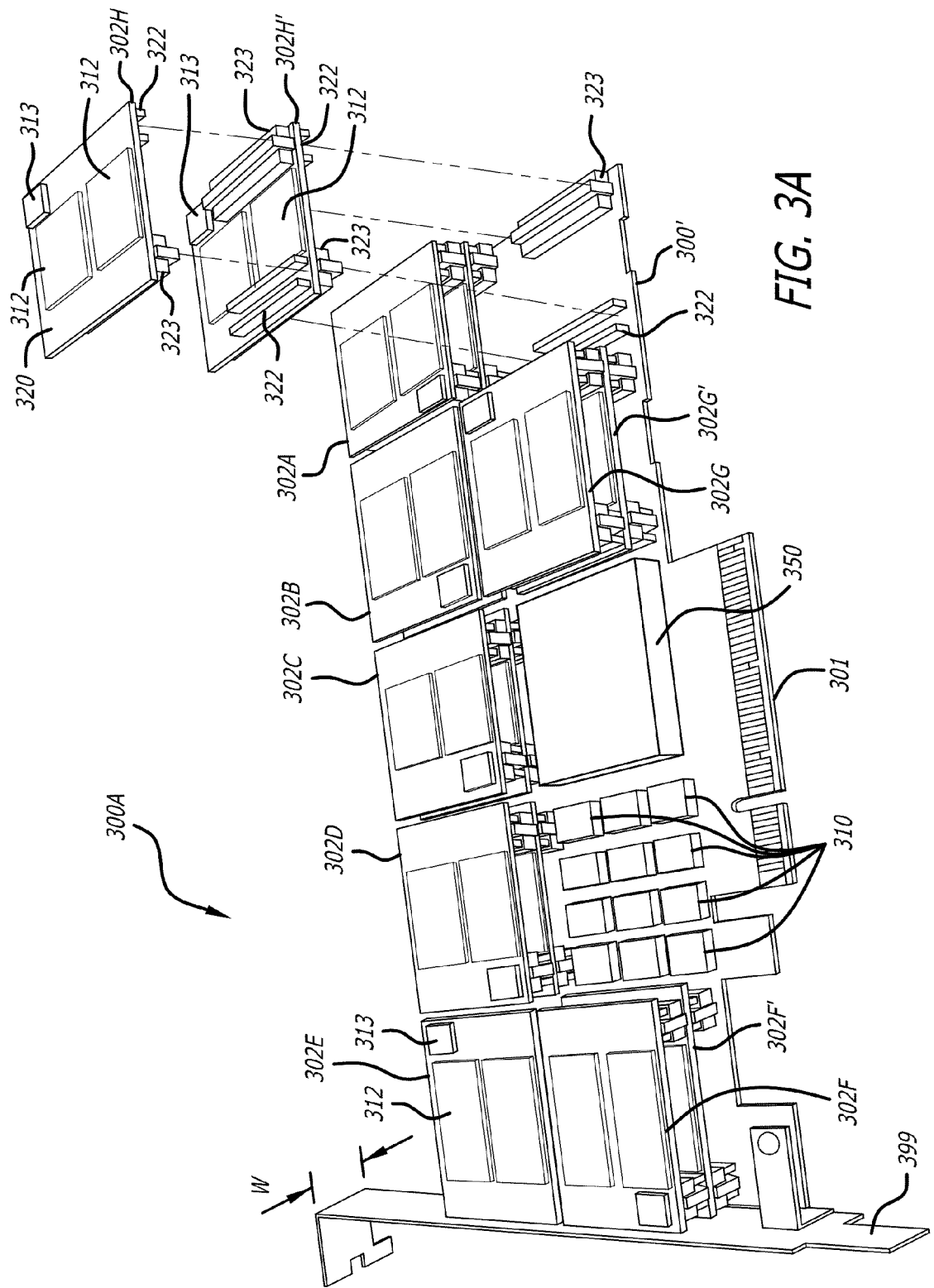
FIG. 3A is a perspective view of a pluggable server memory card with two levels of replaceable pluggable daughter-memory-cards.

Referring now to FIG. 3A, a partially exploded view of an instance of a server memory card 300A is illustrated that may be used for each of the server memory cards (SMC) 300A-300N,300A'-300N' shown in FIGS. 2A-2B.

The server memory card 300A includes a baseboard printed circuit board 300' having a host edge connector 301 and one or more layers of printed circuit board traces. A mounting bracket 399 having a width W is coupled to the baseboard printed circuit board 300'. The mounting bracket 399 may be coupled to a case of the compute server 112,112'. The host edge connector 301 is adapted to couple to the sockets 221A-221N mounted to the motherboard 250 of the host server system.

The server memory card 300A includes one or more master controllers 350 mounted to a side (e.g., top or left side) of the baseboard PCB 300' and one or more slave controllers (see slave controllers 402A-402B in FIG. 4) mounted to a side (e.g., bottom or right side) of the baseboard PCB 300' and coupled to the master controller 350 by a plurality of master-slave memory bus channels. A host bus channel formed of traces of the baseboard printed circuit board 300' may couple the master controllers 217,217' to the host edge connector 301. The one or more slave controllers are adapted to provide transparent access to non-volatile memory. The master controllers and slave controllers provide native access of the non-volatile memory to the processors.

The server memory card 300A further includes a plurality of female daughter-card sockets 322 mounted to the baseboard 300' and respectively coupled to the slave memory controllers by means of the plurality of memory bus channels. The server memory card 300A further includes a plurality of male daughter-card sockets 323 mounted to the baseboard 300' and respectively coupled to the slave memory controllers by means of the plurality of memory bus channels. The daughter-card sockets 322-323 are adapted to receive a plurality of replaceable pluggable daughter memory cards 302A-302H, 302A'-302H'. While male daughter-card sockets 323 and female daughter-card sockets 322 have been described as positioned, they may be interchanged into different combinations including female only daughter-card sockets 322 mounted to the baseboard 300' to receive male only sockets of the daughter card or male only daughter-card sockets 323 mounted to the baseboard 300' to receive female only sockets of the daughter card.

The server memory card 300A further includes one or more of the replaceable pluggable daughter memory cards 302A-302H, 302A'-302H'. Each of the daughter memory cards includes a plurality of packaged non-volatile memory devices 312 mounted to a rectangular printed circuit board. For lower costs, the daughter memory cards avoid having a memory controller such that the flash memory interface of active ones of the plurality of packaged non-volatile memory devices 312 are seen at the connectors 322,323.

The server memory card 300A further includes a non-volatile card configuration device 420 (see FIG. 4) coupled to the one or more master controllers 217,217'. An embedded processor 422 may access the card configuration device 420 through the master controller 217,217' to initialize the server memory card 300. The master controller 217,217' may come out of a reset condition into a minimal functionality mode and access information from the card configuration device to complete initialization and setup of the master controller itself.

The master controllers 217,217' natively control the non-volatile memory devices to obtain predictable bandwidth and latency performance with the non-volatile memory mounted to the daughter-memory-cards. One or more slave controllers are adapted to provide transparent access to non-volatile memory devices 312. All operations that take place on the flash memory device 322 (read, write, erase, plus control operations such as reset, etc.) are completely visible to (and under the control of) the master controller. The flash memory interface of active ones of the plurality of packaged non-volatile memory devices 312 is passed through the slave memory controller to the master controller to which the slave memory controller is coupled.

The master controller is able to directly exercise each of the operations that are supported by the flash memory devices 322. The slave controller may perform protocol conversion, but does not drop/intercept (without involving the flash memory device) a request from the master controller. However, the slave controller does not autonomously initiate any flash memory operation.

In one embodiment of the invention, the plurality of slave controllers 402A-402B (see FIG. 4) are mounted to the baseboard 300' coupled between the master controller 217,217' and the plurality of daughter-card sockets 322-323. In another embodiment of the invention, the plurality of slave controllers are mounted together in an integrated circuit package with the master controller 217,217' and coupled between the master controller 217,217' and the plurality of daughter-card sockets 322-323. In yet another embodiment of the invention, the plurality of slave controllers are mounted to the plurality of daughter-memory-cards 302A-302H, 302A'-302H'coupled between the master controller 217,217' and the plurality of packaged non-volatile memory 312.

Figure 4:
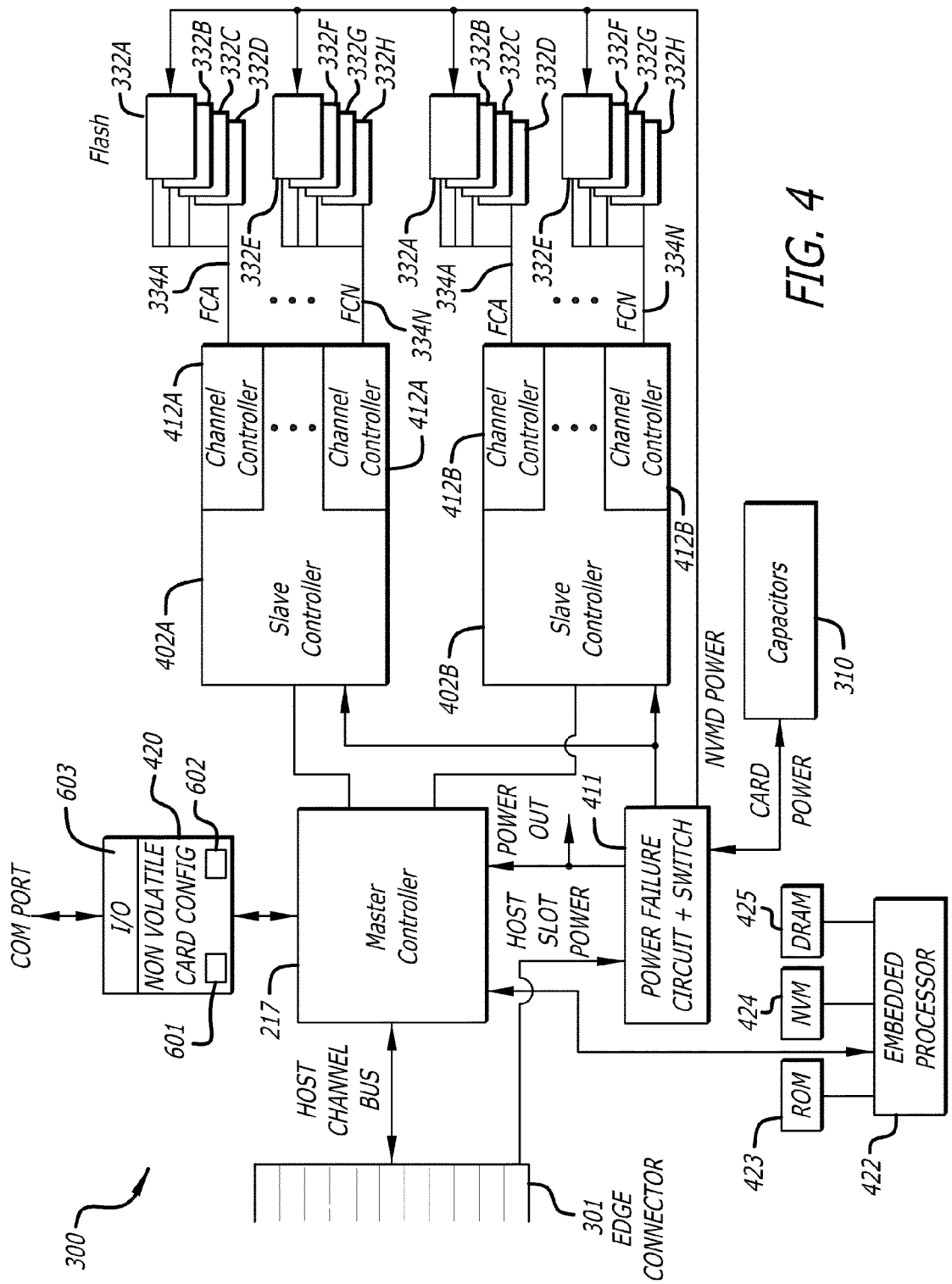
FIG. 4 is a block diagram of a portion of the pluggable server storage card with daughter-memory-cards.

Referring now to FIG. 4, each slave controller 402A-402B is adapted to arbitrate memory bus channels 334A-334N shared by the multiple non-volatile memory devices 312, to buffer and multiplex signals between the master controller 217,217' and the multiple non-volatile memory devices 312, and to combine a sequence of predictable non-volatile memory operations together into a compound operation to improve control bandwidth with the non-volatile memory devices.

Referring now back to FIG. 3A, intermediate daughter-memory-cards 302A'-302H' are removeably plugged into the receptacles 322,323 of the base-board 300'. The intermediate daughter-memory-cards 302A'-302H' include daughter-card sockets 323,322 on top and bottom sides of the rectangular printed circuit board.

Top daughter-memory-cards 302A-302H are respectively removeably plugged into a top-side of the intermediate daughter-memory-cards 302A'-302H'. Signals for the top daughter-memory-cards flow through the intermediate daughter-memory-cards by way of stacked daughter-card sockets 323-323 being plugged together. As discussed herein, each of the daughter memory cards 302A-302H, 302A'-302H' includes a plurality of packaged non-volatile memory devices 312 mounted to a rectangular printed circuit board.

Referring now to FIGS. 3A and 4, the server memory card 300A further includes a plurality of high density power capacitors 310 and power failure circuitry 411 (see FIG. 4) mounted to the baseboard 300' to store card power and switch from host power to card power in the case of power failure. The power failure circuitry 411 is coupled to the edge connector 301 to receive host or slot power and ground. The power failure circuitry 411 is coupled to the plurality of high density power capacitors 310 to receive capacitor power and ground (also referred to as card power). The power failure circuitry 411 further couples to the master controller 217, 217', the plurality of slave controllers 402A-402B, the plurality of daughter-card sockets 323,322 and daughter-memory-cards 302 coupled thereto, and the non-volatile card configuration device 420 in order to provide power (either the slot power or the card power) thereto.

The power failure circuitry 411 detects slot power failure and switches from supplying slot power to provide capacitor or card power to the devices to which it couples. The power failure circuitry 411 further notifies the master controller 217,217' and the plurality of slave controllers 402A-402B to switch into a power failure mode to execute data preservation operations. Upon initial power up of the server memory card, the power failure circuitry charges the plurality of high density power capacitors 310 before the master memory controller 217,217' and the plurality of slave memory controllers 402A-402B permit access to the non-volatile memory devices of the daughter-memory-cards 302. The edge connector 301 of the server memory card may include staggered power pins (Ground pins first, power second) in order to provide hot plugability.

As shown in FIG. 4, each server memory card 300A may further include an embedded processor 422, a read only memory (ROM) 423, a non-volatile memory 424, and a dynamic random access memory (DRAM) 425 mounted to the baseboard 300' and coupled together as shown. The ROM 423 stores boot instructions for the server memory card 300A. The DRAM 425 proves scratch pad memory to the embedded processor 422 and can store translation structures (e.g., a translation table mapping logical addresses to physical addresses) to access data in the non-volatile memory devices 312. The non-volatile memory 424 includes firmware instructions that may be periodically upgraded. The firmware instructions drive and control the master and slave memory controllers 217, 402A-402B to perform read, write, erase or maintenance operations to access data with the non-volatile memory devices 312 of the daughter-memory-cards 302. The embedded processor 422 executes the firmware instructions to drive and control the master and slave memory controllers to access data as well as read, write, and maintain the translation structures in the DRAM.

The embedded processor 422 is further coupled to the master memory controller 217,217' and the edge connector 301 to communicate with each. The embedded processor is also in communication with the host processors 222A-222N over the edge connector to receive read and write operation requests from the host application or host operating system software to access data in the NVMDs.

Referring now back to FIGS. 2A-2B, the server 112,112' includes a host driver stored in a host storage device 233. The host driver stored in the host storage device 233 includes instructions that can be executed by one or more of the host processors 222A-222N that may result in issuing read or write memory requests to one or more server memory cards. In an alternate embodiment, the host driver stored in the host storage device can also directly interact with the master memory controller so that read/write requests can be issued directly.

Daughter Memory Card (DMC)

As discussed herein, the server memory card may include intermediate daughter-memory-cards 302A'-302H' and/or top daughter-memory-cards 302A-302H having male daughter-card sockets 323 and/or female daughter-card sockets 322 and respectively plugged into the female daughter-card sockets 322 and/or male daughter-card sockets 323. The one or more sockets 322,323, mounted to the top or bottom sides of the printed circuit boards near opposite edges, may also be referred to as pluggable electrical connectors. The female socket 322 may also be referred to as a receptacle and the male socket 323 may also be referred to as a plug. The one or more sockets 322,323 may be mounted parallel or perpendicular to the top or bottom sides of the printed circuit boards to make respective connections in parallel with or perpendicular to the edge connector 301.

In FIG. 3A, intermediate daughter-memory-cards 302A'-302H' are removeably plugged into the sockets 322-323 of the base-board 300'. Top daughter-memory-cards 302A-302H are respectively removeably plugged into a top-side of the intermediate daughter-memory-cards 302A'-302H'. A dual level of daughter-memory-cards is used in the server memory card 300A. While only two levels of daughter-memory-cards are shown, additional levels may be added provided the spacing requirements are more relaxed, such as by using a double wide bracket 399 with the base-board 300'. Alternatively, spacing requirements may be more stringent or costs may be a factor, in which case a single level of daughter-memory-cards may be used.

In FIG. 3D, top daughter-memory-cards 302A-302H are removeably plugged into sockets 322-323 of the base-board 300' providing for a single level of daughter-memory-cards being used in the server memory card 300D.

The number of levels of daughter-memory-cards may typically limited by the width W of the bracket 399 setting the spacing requirements from neighboring cards. That is, the overall width of the server memory card may be no greater than the width W of the bracket.

Figure 3B:
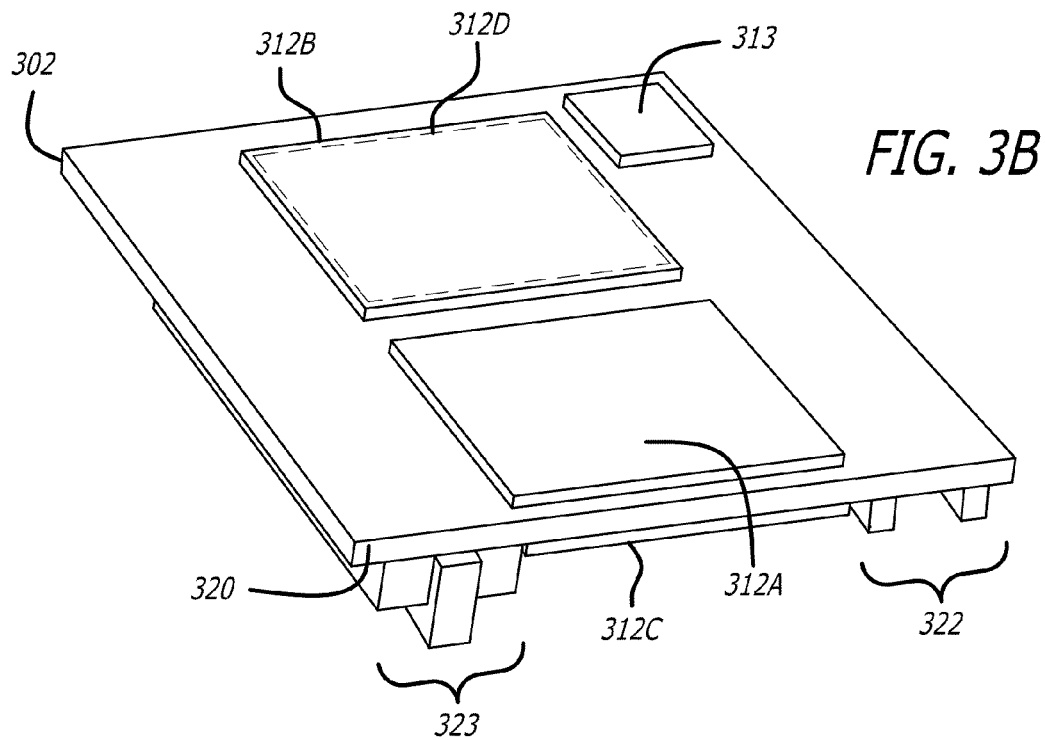
FIG. 3B is a perspective view of an intermediate replaceable pluggable daughter-memory-card.

Referring now to FIG. 3B, a perspective view of a top daughter-memory-card 302 is illustrated that is an instance of each of the top daughter-memory-cards 302A-302H shown in FIGS. 3A and 3D.

The top daughter-memory-card 302 includes a rectangular shaped multilayer printed circuit board 320 with a plurality of non-volatile memory devices 312A-312D (collectively referred to as non-volatile memory devices 312), a support chip 313, a male socket 323, and a female socket 322 mounted thereto. Electrical pins of the male socket 323 and the female socket 322 are coupled to the plurality of non-volatile memory devices 312A-312D by printed circuit board traces of the printed circuit board 320. The male socket 323 and the female socket 322 are mounted perpendicular to the bottom-side of the printed circuit board 320 of the top daughter-memory-card 320. Sockets may not be mounted to a top-side of the printed circuit board 320 of the top daughter-memory-card to reduce costs and meet the width requirement of the server memory card 300A.

Figure 3C:
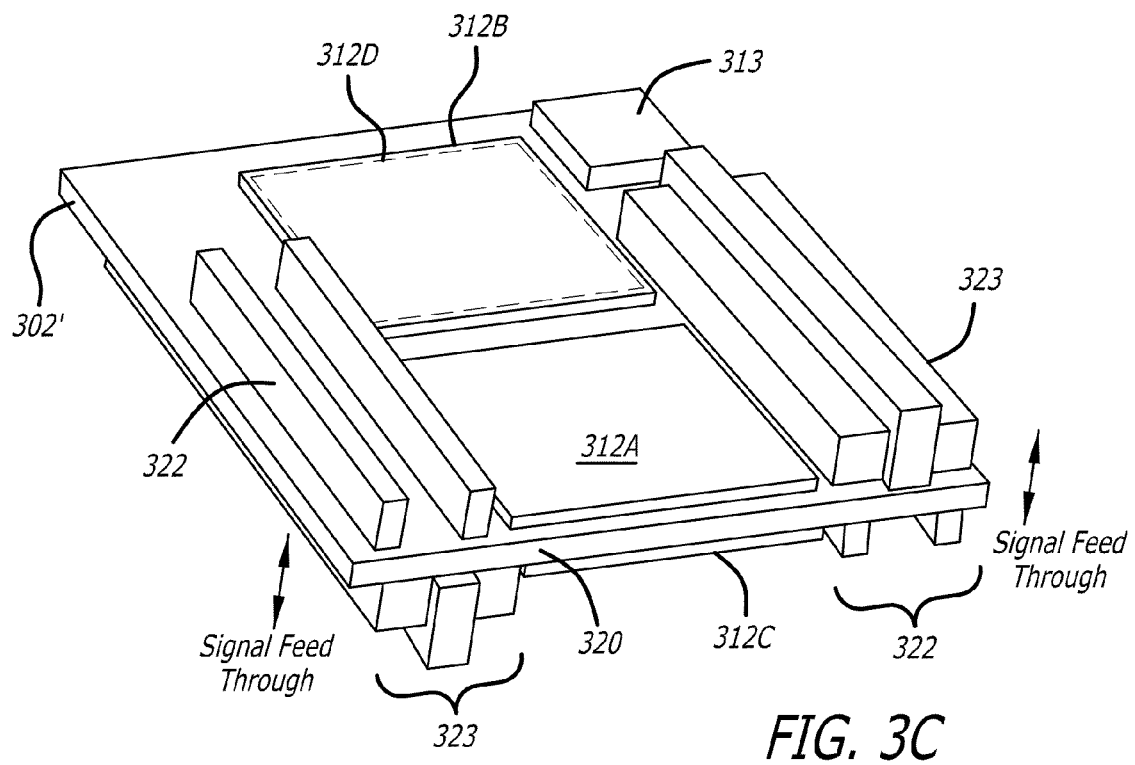
FIG. 3C is a perspective view of a top replaceable pluggable daughter-memory-card.

Referring now to FIG. 3C, a perspective view of an intermediate daughter-memory-card 302' is illustrated that is an instance of each of the intermediate daughter-memory-cards 302A'-302H' shown in FIG. 3A.

The intermediate daughter-memory-card 302', similar to the top daughter-memory-card, includes a rectangular shaped multilayer printed circuit board 320 with a plurality of non-volatile memory devices 312A-312D, a support chip 313, male sockets 323, and female sockets 322 mounted thereto. Electrical pins of the male sockets 323 and the female sockets 322 are coupled to the plurality of non-volatile memory devices 312A-312D by printed circuit board traces of the printed circuit board 320.

The intermediate daughter-memory-cards 302A'-302H' include daughter-card sockets 323-323 mounted perpendicular to both top and bottom sides of the rectangular printed circuit board 320. A female socket 322 may be mounted on the top-side near a left or right side or edge in alignment with a male socket 323 on the bottom-side. Similarly, a male socket 323 may be mounted on the top-side near a right or left side or edge in alignment with a female socket 322 on the bottom-side. The pins of the top sockets are coupled to the pins of the bottom sockets so that signals can flow up or down through the printed circuit board 320. As the gender of the sockets changes from top to bottom, top daughter-memory-cards 302A-302H may be removeably plugged into a top-side of the intermediate daughter-memory-cards 302A'-302H', while the intermediate daughter-memory-cards 302A'-302H' plug into the sockets of the base-board 300'. Signals for the top daughter-memory-cards flow through the intermediate daughter-memory-cards to the base-board by way of stacked daughter-card sockets 323-323 being plugged together.

As discussed previously, each of the daughter memory cards 302A-302H, 302A'-302H' includes a plurality of packaged non-volatile memory devices 312 mounted to a rectangular printed circuit board. In one embodiment of the invention, four non-volatile memory devices 312A-312D are mounted to the printed circuit board 320 of the top daughter-memory-card 302 and/or the intermediate daughter-memory-cards 302'. The non-volatile memory devices 312A-312B may be mounted to the top-side while non-volatile memory devices 312C-312D may be mounted to the bottom-side of the printed circuit board 320.

Signal lines on the top-side from the non-volatile memory devices 312A-312B are fed through to the male socket 323 and/or the female socket 322 mounted to the bottom-side of the printed circuit board 320. Signal lines on the bottom-side from the non-volatile memory devices 312C-312D are coupled to the male socket 323 and/or the female socket 322 mounted to the bottom-side of the printed circuit board 320. On the intermediate daughter-memory-card, the pins of the top sockets are coupled to the pins of the bottom sockets so that signals can flow up or down through the printed circuit board 320. When in a stacked configuration (dual level), signals from the non-volatile memory devices 312A-312D of the top daughter-memory-card 302 are fed up and down through to the male socket 323 and/or the female socket 322 mounted to the bottom-side of the printed circuit board 320 of the intermediate daughter-memory-card 302', as shown by the arrows in FIG. 3C.

In one embodiment of the invention, a portion (e.g., half) of the signals in each connector of a daughter card are for the NVMDs mounted to the bottom side while the remaining portion (e.g., the other half) of the signals are for the NVMDs mounted to the top side. In another embodiment of the invention, signals in connectors of a daughter card on one side of the printed circuit board are for the NVMDs mounted to the bottom side while signals in connectors on the opposite side are for the NVMDs mounted to the top side.

Referring now to FIG. 3E, an exemplary block diagram of a daughter memory card 302 is illustrated as an instance of the daughter memory cards 302A-302H, 302A'-302H'. The daughter memory card 302 includes non-volatile memory devices 312A-312D mounted to the board 320 and coupled to an end of printed circuit board traces that form memory subchannels.

Memory subchannels 327A-327D are formed on the daughter memory card between each NVMD and socket 323, 322 coupled to the card. For example, a memory subchannel MSCA 327A is formed between NVMD 312A and the socket. Each memory subchannel may be 16 bits wide to carry multiplexed address/data. Each memory subchannel has one or more 8 bit flash memory channels (also referred to as flash channels herein) from an NVMD. In an embodiment described herein, each memory subchannel has two 8 bit flash memory channels. In this case, each memory subchannel MSCn 327N has a 16 bit data bus with multiplexed address/data, 8 independent chip enable control bits, and additional shared control bits.

A memory channel MCn 325N of printed circuit traces on the server memory card 300 is formed between each daughter memory card 302 (pair of sockets 322-323) and the respective slave controller to which they are coupled. In an embodiment described herein, each memory channel MCn 325 has a 64 bit data bus with multiplexed address/data, 32 independent chip enable control bits, and additional shared control bits.

Each of the daughter memory cards 302A-302H, 302A'-302H' includes one or more support chips 313 mounted to the rectangular printed circuit board 320. The support chips 313 uniquely identify the daughter memory card and the non-volatile memory devices mounted thereto such as by a combination of numbers and letters similar to serial numbers. This is so the health of each non-volatile memory chip in the non-volatile memory device can be uniquely monitored for warning signs of failure mechanisms associated with non-volatile memory devices.

The support chips 313 may further multiplex signals between the non-volatile memory devices and the male and female sockets 322-323. The one or more support integrated circuits 313 may further include buffers and queue registers to transparently buffer and combine non-volatile memory access operations together to increase memory bandwidth with the non-volatile memory devices.

In the embodiment of the daughter memory card 302 illustrated in FIG. 3E, an upper support chip 313U and a lower support chip 313L are coupled to and between the memory channel 325N and the non-volatile memory devices 312A-312D. While control signals may be multiplexed by each support chip for the respective NVMDs, the 16 bit data busses of memory subchannels 327A-327D may simply pass through or around the support chips and simply be aggregated together and coupled to the data bus of the memory channel MCn 325N. Alternatively each support chip may buffer the address and data with the memory channel data/address bus.

If the daughter memory card is an intermediate card, the memory channel MCN 325n is fed through and coupled to one or more sockets so that signals may be transferred to the upper daughter memory card. In other embodiments of the invention, other methods of routing signals and making connections between the baseboard, the intermediate daughter cards, and the upper daughter cards may be used, such as a flex connector for example.

The NVMDs may be implemented differently so there are alternate embodiments. For example, FIGS. 3F and 3G illustrate different implementations.

Figure 3F:
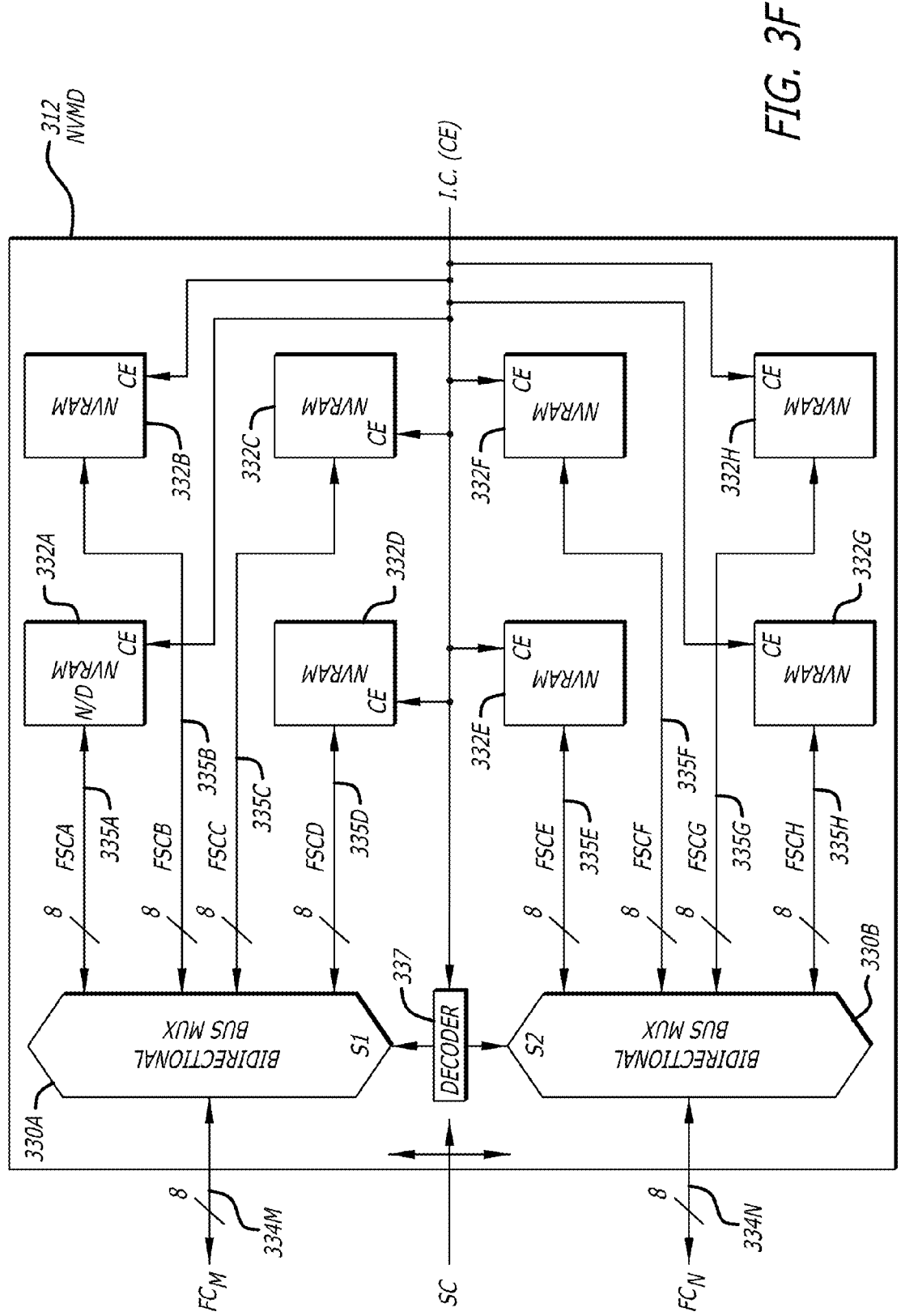
FIG. 3F is a block diagram of a non-volatile memory device that may be mounted to a replaceable pluggable daughter-memory-card.
Figure 3G:
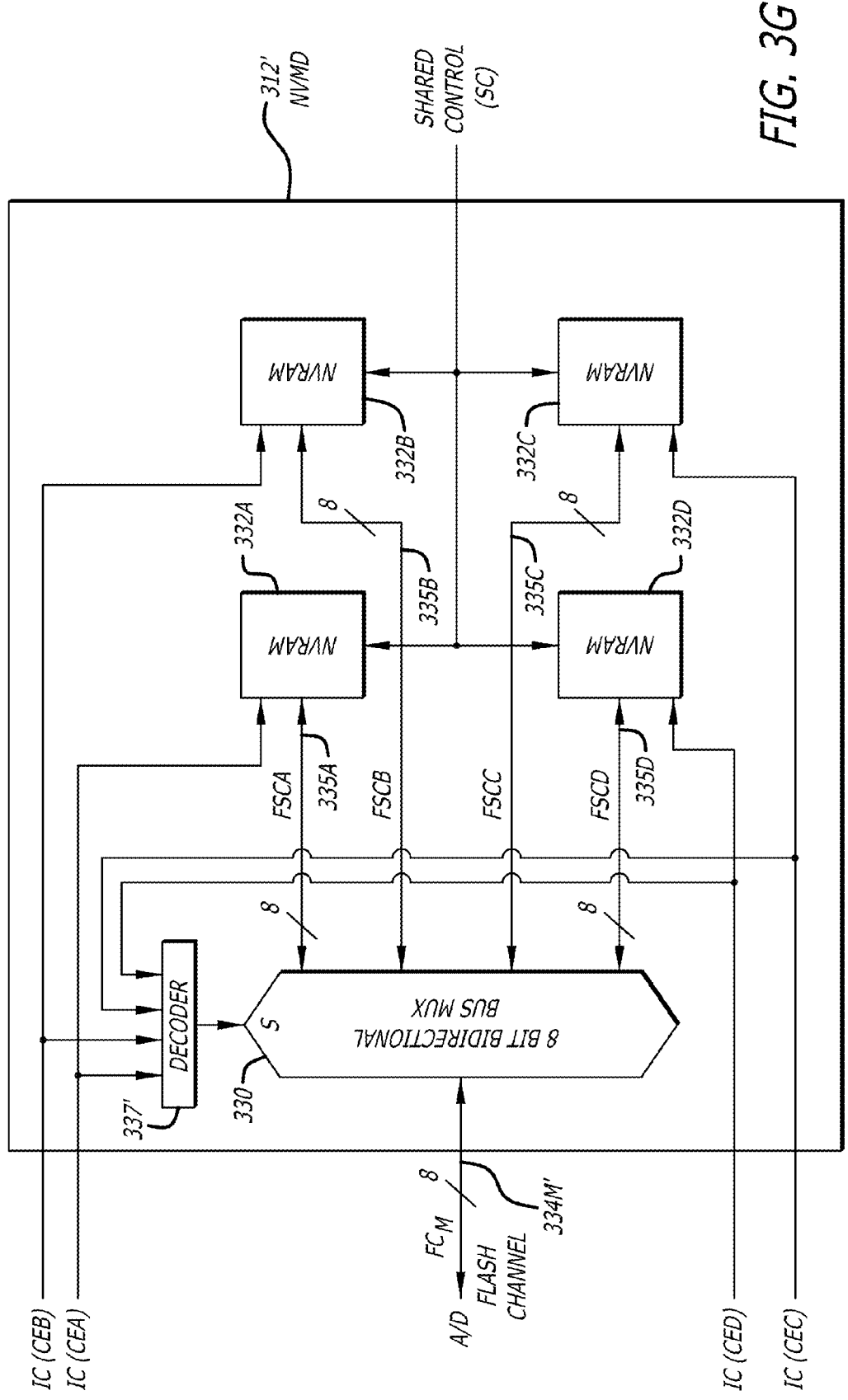
FIG. 3G is a block diagram of a alternate non-volatile memory device that may be mounted to a replaceable pluggable daughter-memory-card.

Referring now to FIG. 3F, a block diagram of a packaged non-volatile memory device (NVMD) 312 is shown. The NVMD 312 has two flash channel interfaces FCm 334M and FCn 334N. The NVMD 312 includes a plurality of non-volatile random access memory (NVRAM) chips or integrated circuits 332A-332D and 332E-332H. The NVMD 312 further includes, a plurality of eight bit bidirectional flash subchannels (FSCA-FSCD) 335A-335D, (FSCE-FSCH) 335E-335H, bidirectional bus multiplexors 330A-330B and a decoder 337 coupled together as shown.

Each flash channel FCn 334 has an 8-bit data bus with multiplexed address/data, 4 independent chip enable control bits, and additional shared control bits. Each flash channel logically has one or more flash subchannels. A flash subchannel is the logical connection made between a daughterboard connector and a single flash NVRAM die 332 within the NVMD 312. In the embodiments shown in FIG. 3F-3G, each flash channel is associated with four logical flash subchannels.

The NVRAM chips 332A-332H may be NAND flash memory, NOR flash memory, phase change memory, or other types of non-volatile random access memory. Each daughter-memory-card 302,302' may have different types of non-volatile random access memory that can be identified to the server memory card and the card configuration device so that read operations, write operations, and/or erase or maintenance operations can be tailored to the given type of memory. For example, flash programmable electrically erasable programmable read only memory (flash memory) has an erase operation performed on entire blocks of memory cells that is used before a write operation is performed to the block of memory cells. However, phase change memory does not need to erase blocks of memory cells before the memory cells can be written. However, other maintenance operations may be performed with phase change memory or other types of non-volatile memory. In one embodiment of the invention, the NVRAM chips are NAND flash memory die having 8 gigabits (Gb) of memory capacity per die (8 bits×1 gigabit) with a multiplex A/D data bus.

The plurality of eight bit bidirectional flash subchannels (FSCA-FSCD) 335A-335D, (FSCE-FSCH) 335E-335H are coupled between NVRAM chips 332A-332H and bidirectional bus multiplexors 330A-330B. The decoder 337, coupled to chip enable signals, can generate a select signal for the multiplexers 330A-330B to select and multiplex two of the eight flash memory subchannels onto the two flash channels FCm and FCn, respectively.

Each of the 8 bit flash subchannels and the flash channels multiplex address and data together onto the same data bus. Additionally, there are independent and shared control signal lines associated with the flash subchannels 335A-335H that couple to the NVRAM chips 332A-332H. There are eight independent chip enable control signals (CEA through CEH) one for each NVRAM chip and at least one shared control line that jointly couples to all the NVRAM chips.

Referring now to FIG. 3G, a block diagram of a packaged non-volatile memory device (NVMD) 312' is shown. The NVMD 312' has a single flash channel interface FCm 334M and includes the plurality of non-volatile random access memory (NVRAM) chips or integrated circuits 332A-332D. The NVMD 312' further includes, a plurality of eight bit bidirectional flash subchannels (FSCA-FSCD) 335A-335D, a bidirectional bus multiplexor 330 and a decoder 337' coupled together as shown.

As discussed herein, the NVRAM chips 332A-332D may be NAND flash memory, NOR flash memory, phase change memory, or other types of non-volatile random access memory. To achieve a similar capacity to the NVMD 312 on a single layer of daughter memory cards, two layers of stacked daughter memory cards may be used.

The plurality of eight bit bidirectional flash subchannels (FSCA-FSCD) 335A-335D, are coupled between NVRAM chips 332A-332D and the bidirectional bus multiplexor 330. The decoder 337', coupled to chip enable signals, can generate a select signal for the multiplexer 330 to select and multiplex one of the eight flash memory subchannels to be coupled with the one flash channel FCm.

Additionally, there are independent control signal lines (IC) and shared control signal lines (SC) associated with the flash subchannels 335A-335D that couple to the NVRAM chips 332A-332D. There are four independent chip enable control signals (CEA through CED) one for each NVRAM chip and may be one or more shared control signal lines that jointly couples to all the NVRAM chips.

Sustained Performance

In FIG. 2B, the master memory controller driver 303' stored in a storage device is in communication with each of the master memory controllers 217A'-217N' (collectively referred to as 217'). The master memory controller driver 303,303' may also be referred to as a software driver or driver software. In FIG. 4, the master memory controller driver 303,303' may be stored in the read only memory 423 or NVM 424 for example, executed by the processor 422 to initialize the memory controller 217,217'. The master memory controller driver 303 may include software instructions that when executed by the processor 422 provides support services to the server memory card (SMC) 300. The driver software may be implemented as firmware instructions executed by the embedded processor 422 of the server memory card 300 illustrated in FIG. 4.

One such support service provided is an operations scheduler to schedule read, write, and erase operations with the plurality of NVMDs 312 over the memory channel buses 334A-334N of each slave controller 402A-402B. Another support service provided is garbage collection to reclaim unused or invalid memory locations in the NVMDs 312 that are fragments of unused data or store invalid data. Garbage collection reclaims unused or invalid memory capacity in the NVMDs 312. Garbage collection is further described herein. Still another support service that may be provided is wear leveling to even out wear (write and erase operations) on the memory locations in the NVMDs.

In FIGS. 2A-2B, application software and/or operating system software may be executed by one or more of the processors 222A-222N and issue block memory access requests to the driver software 303 to read or write blocks of data with the main memory 260,260'. The driver software may aggregate a number of block memory access requests from application software and/or operating system software into sets of one or more block memory access requests against the master memory controllers 217,217A'-217N'.

Figure 5:
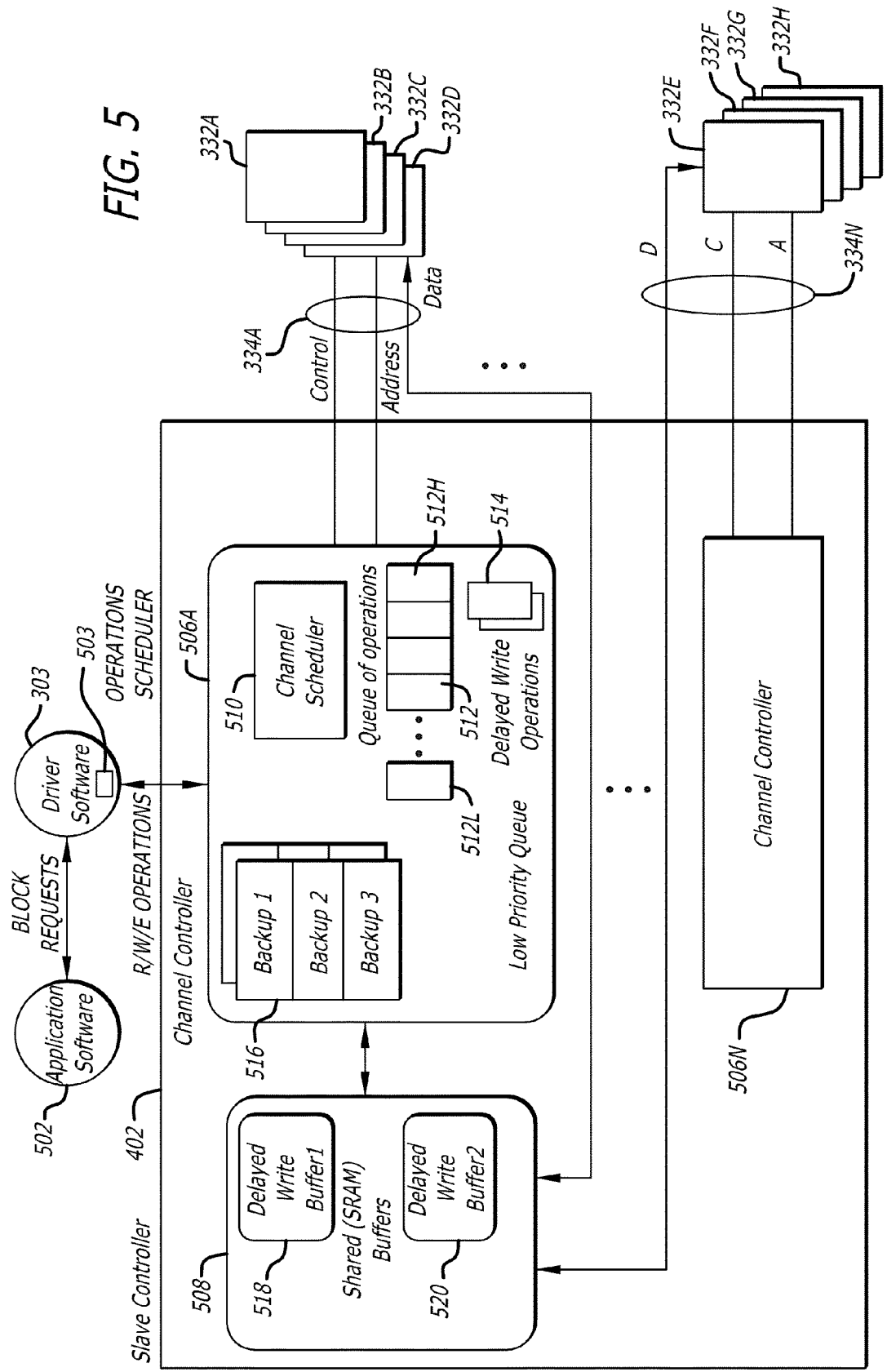
FIG. 5 is a block diagram of a slave memory controller coupled to non-volatile memory devices of a daughter-memory-card.

Referring now to FIG. 5, a slave memory controller 402 is coupled to a plurality of flash memory channels 334A-334N and their respective control (C), address (A), and data (D) busses. A plurality of NVMDs are coupled to a set of the plurality of memory channels to share buses. Application software 502 is coupled in communication with the driver software 303 to issue block memory access requests to the driver software. By way of the master memory controller, the driver software 303 is coupled in communication with the slave memory controller 402 and its one or more channel controllers 506A-506N, one for each flash channel 334A-334N. The driver software communicates read operations, write operations, and erase operations to the one or more channel controllers. The slave memory controller 402 further includes a shared data buffer 508. The one or more channel controllers 506A-506N are coupled in communication with the shared data buffer 508. The shared data buffer 508 is coupled to the data busses of the plurality of memory channels 334A-334N to read and write data with the NVMDs. The one or more channel controllers 506A-506N are coupled to the control and address busses of the plurality of memory channels 334A-334N to send address and control signals to the NVMDs.

Each NVMD can independently execute one read, write, or erase operation at a time. A memory channel can communicate one read, write, or erase operation at a time to an NVMD. For example, while four operations are coincidentally executed by four NVMDs, one operation is being communicated over the memory channel at a time to an NVMD of a plurality of NVMDs coupled thereto. Regardless the slave memory controller is coupled to the plurality of memory channels in communication between the plurality of NVMDs 312A-312D (collectively referred to as 312).

Each of the one or more channel controllers 506A-506N includes a channel scheduler 510, an operations queue 512, a delayed write operations storage 514, and a backup storage 516 coupled in communication together. The channel scheduler 510 schedules control and data transfers associated with the read, write, and erase operations on a memory channel. The operations queue may be formed of a high and low priority queue coupled in communication with the channel scheduler 510. The read, write and erase operations from the driver software are stored in the low priority queue and the high priority queue of the operations queue 512. The channel scheduler prioritizes the operations waiting in the high priority queue over the operations waiting in the low priority queue. The channel scheduler further prioritizes read operations waiting in either the high priority queue or the low priority queue over write and erase operations waiting in each respective queue.

The application or operating system software 502 includes instructions that when executed by a processor issues block memory access requests. The driver software 303 includes instructions that when executed by a processor provide an operations scheduler 503 to receive the block memory access requests.

The driver software 303 issues read, write, and erase operations to the plurality of NVMDs coupled to each of the plurality of memory channels in response to the block memory access requests. The high priority read, write and erase operations are stored in the high priority queue of the operations queue 512 by the driver software 303. The low priority read, write and erase operations are stored in the low priority queue of the operations queue 512 by the driver software 303. The operation of the driver software to schedule read and write operations is in part responsive to the application software or operating system making block memory access requests. The operation of the driver software to schedule read, write and erase operations is further responsive to garbage collection activity with the plurality of NVMDs.

The read, write erase operations correspond to application data requests, metadata requests, and garbage collection requests. Application data requests are block memory access requests made by the application software 502. Metadata requests are requests to store translations between a logical block number in a block device view and a physical block address identifying a unique memory block in an NVMD. Garbage collection requests correspond to operations issued by the driver software 303 to reclaim unused or invalid memory capacity in the NVMDs. Application data requests and metadata requests are stored in the high priority queue of the operations queue. Garbage collection requests are stored in the low priority queue of the operations queue. The driver software may provide fairness in execution of high and lower priority operations. The driver software monitors the number of outstanding high and lower priority operations in the high and low priority queues. In response to the number of outstanding low priority operations reaching a predetermined threshold, the driver software may throttle down the execution of the high priority operations in the high priority queue so that outstanding low priority operations are executed.

Each server memory card has a two-level scheduling hierarchy including an operation scheduler 503 at the driver level for each server memory card, and a channel scheduler 510 at the slave controller level for each channel controller 506A-506N as shown in FIG. 5.

The operation scheduler 503 takes into consideration the mix of operations issued against a logical view of the NVMDs. The operation scheduler 503 thinks of the collection of NVMDs at the level of flash channels 334A-334N and not at the level of the individual NVRAM dice 332A-332H.

The channel scheduler 510 is responsible for dealing with the specifics of the NVRAM dice 332A-332H behind the flash channels 334A-334N. The channel scheduler 510 orchestrates use of the shared address/data busses in each flash subchannel 335A-335H by the NVRAM dice 332A-332H to maximize performance of the server memory card.

At its level, the operation scheduler is responsible for making progress on all three types of operations (read, write, erase), in a fashion that allows overall progress on the workload of interest; making sure that low-latency operations such as reads don't end up getting queued behind longer-latency operations such as erases; making sure that the mixing of requests from application block requests, meta-data requests, and garbage collection requests are handled appropriately; and managing power consumption of the card (reads, writes, and erases consume different power, so the operation scheduler can control overall card power consumption by controlling how many of these are active at a time).

At its level, the channel scheduler is responsible for managing bus utilization for multi-phase operations with different latency—predictable latency such as reads, as well as varying latency such as writes and erases; prioritizing channel allocation for high-priority vs. low-priority operations; and within the high-priority operations, prioritizing low-latency operations to reduce blocking times at the application level. In response to the scheduled read, write, and erase operations with the plurality of NVMDs scheduled by the operations scheduler 503, a channel scheduler associated with a memory channel may schedule read operations, write operations, and erase operations to maximize channel utilization.

For example, in response to a set of one or more block memory access requests, the driver software schedules X NVMDs to perform read operations, Y NVMDs to perform write operations, and Z NVMDs to perform erase operations. The variables X, Y, and Z are responsive to the work load required by the application or operating system software and their sum (X+Y+Z) corresponds to the total number of NVMDs in the system (or alternatively the number of concurrently activatable NVMDs given a power budget). The selection of values for X, Y, and Z may be a function of the read to write ratio of the application workload requests and whether or not garbage collection is active with the plurality of NVMDs.

Garbage collection is a method of recovering memory space in each NVMD and may be activated for a number of reasons. Garbage collection may be activated when a ratio of currently used capacity to available capacity exceeds a first threshold and deactivated when the ratio falls below a second threshold different from the first. Alternatively or conjunctively, garbage collection may be activated for regions of memory locations in an NVMD that exceed a predetermined time limit of last access.

If garbage collection is inactive, values for X, Y, and Z may be selected to limit the impact of NVMD write and erase operations on NVMD read operations. Alternatively if garbage collection is inactive, values for X, Y, and Z may be selected to limit the impact on NVMD read latencies for NVMD read operations and to limit the impact on NVMD write latencies for NVMD write operations. If garbage collection is active, values for X, Y, and Z may be selected to match a rate of freeing capacity by the garbage collection activity to a rate of consumption of capacity by the application workload.

The first channel scheduler schedules L read operations, M write operations, and N erase operations for each memory channel in response to the scheduled read, write, and erase operations with the plurality of NVMDs scheduled by the operations scheduler 503. If L read operations, M write operations, and N erase operations are scheduled by the operation scheduler with the plurality of NVMDs coupled to a first memory channel, the first channel scheduler schedule the L read operations, the M write operations, and the N erase operations on the first memory channel to maximize channel utilization.

Garbage Collection and Memory Capacity Reclamation

Most NVMDs, for example NVMDs with NAND Flash, do not support an update-in-place operation. In this case, a memory block is first placed in a special state (e.g., erased state) before it can be written with new information. The operation to place the memory block in a special state is referred to as an erase operation. Thus, memory blocks of NVMDs and NVRAM therein need to be erased prior to being written with information.

The granularity at which the erase operation can be performed is referred to as an erase block. Typically, erase blocks are much larger in size than write pages, which are the granularity at which information can be written to NVMDs. For example, erase blocks in a particular NVMD may be 256 kilo-bytes (KB) in size, while write pages may be 4 KB in size.

One approach to writing to such NVMDs includes operations to copy out the contents of the containing erase block, update the write page of interest, erase the entire block, and rewrite it with the new merged information. However, given the difference in the erase block size and the write page size, this approach can be very inefficient.

An alternate approach involves pre-erasing regions of the NVMD, and then placing them into service as required to receive write requests of new information. Information is always written to a previously erased location, so only includes operations to write such information and therefore can be completed with high performance. Once all pre-erased locations of the NVMD have been written with information once, a special operation is used to reclaim unused or invalid memory capacity.

The special operation used to reclaim unused or invalid memory capacity is referred to as garbage collection. Garbage collection relocates valid data from previously used NVMD locations to new, previously erased, locations, thereby allowing the memory space in previous locations to be reclaimed for subsequent write operations. The memory space is reclaimed by performing an erase operation against the erase blocks making up the space, and placing these blocks into service as targets of new write operations. Thus, garbage collection activity may involve a combination of one or more read operations (to read valid data from previously used NVMD locations), write operations (to write this data to new, previously erased, locations), and erase operations (to reclaim the memory space of previously used locations and place them into service for receiving new writes). These read, write, and erase operations consume flash channel (and flash subchannel), and other NVMD resources in the same fashion as read and write activities initiated by the application workload.

Additionally, consumption of read and write flash channel (and flash subchannel) bandwidth by garbage collection activity can interfere with foreground activities initiated by the application workload. Increased garbage collection activity may end up leaving a smaller fraction of flash channel and subchannel bandwidth available for use by foreground activities. Thus, garbage collection tuning between foreground and background can provide for a sustained and predictable performance.

Figure 6A:
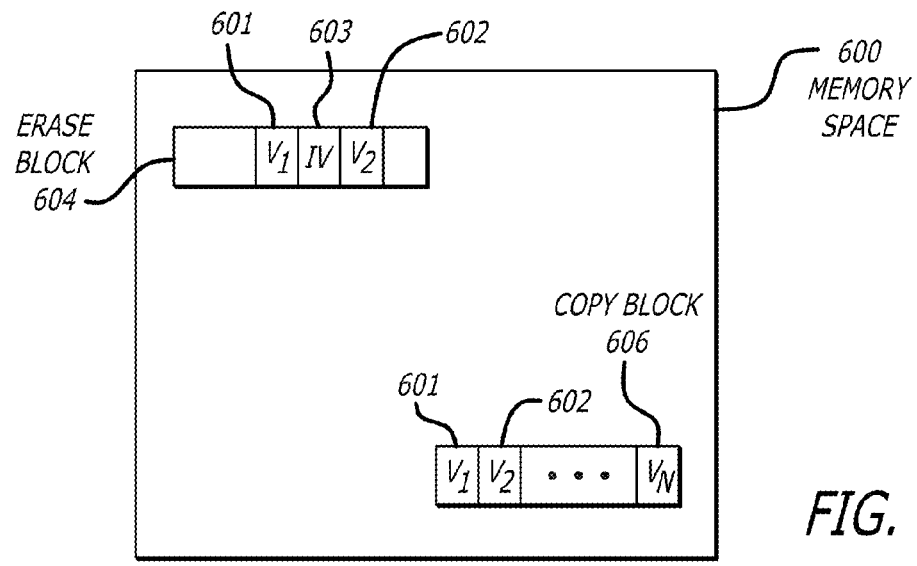
FIG. 6A is a diagram of memory space to illustrate the function of garbage collection with a block non-volatile memory having both valid and invalid memory locations.

Referring now to FIG. 6A, garbage collection is a process or service provided for a server memory card to reclaim unused or invalid memory capacity in the NVMDs. Memory space 600 has valid regions V1 601, V2 602, and an invalid region IV 603 in a memory block 604 for example. It is desirable to eliminate the invalid regions from the memory space while retaining the valid regions.

Garbage collection has a relocation phase and an erase phase of operation. During the relocation phase, the valid regions V1 601, V2 602 are read out from the block 604 that has invalid regions that can be eliminated from the memory space. The valid regions V1 601, V2 602 are then relocated by writing them together with other valid regions V1 through VN into another block 606 with an NVMD write operation. During the erase phase, the block 604 can then be erased by an NVMD erase operation along with other blocks containing invalid regions that have had their valid regions relocated. The erased blocks can then be put back into service.

As mention herein, garbage collection requests correspond to operations issued by the driver software 303 to reclaim unused or invalid memory capacity in the NVMDs and are typically stored in the low priority queue of the operations queue for execution in the background. Garbage collection may be performed in the foreground, when there is no space available to store the information of new write requests. At this time, new write requests cannot be serviced until some erased blocks are put into service by first relocating the previous contents of these blocks and erasing them. Alternately, garbage collection may be performed in the background, together with ongoing application write requests.

Figure 6B:
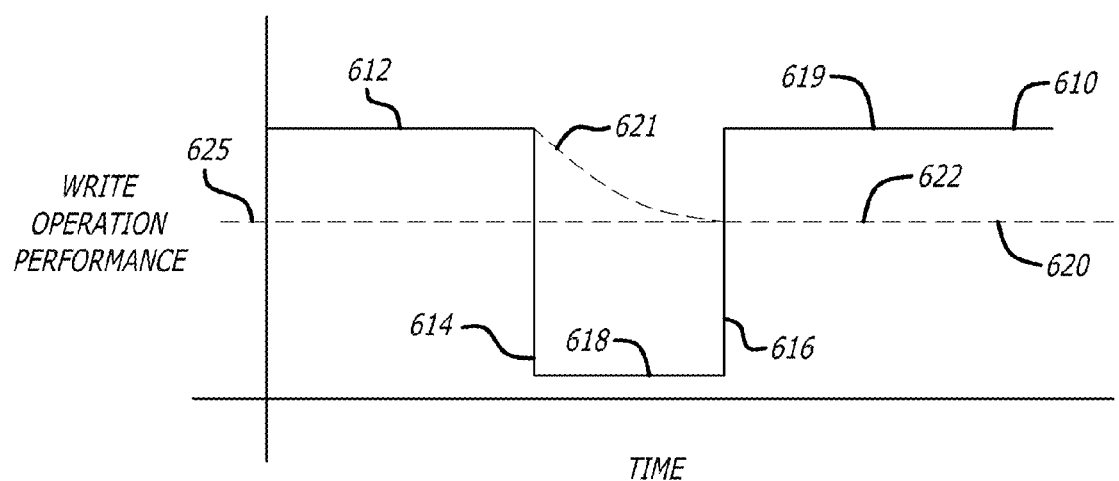
FIG. 6B illustrates charts of exemplary write operation performance with and without garbage collection.

Referring now to FIG. 6B, exemplary graphs of the write operation performance into the NVMDs of a server memory card are shown with and without background garbage collection. Graph 610 illustrates write operation performance without background garbage collection. Graph 620 illustrates write operation performance with background garbage collection.

Write operation performance into the NVMDs of a server memory card is unpredictable without background garbage collection. When the server memory card is empty, with memory locations available to store write request information, the initial performance of the NVMDs is at a high performance portion 612. A steep loss of performance 614 on the graph 610 can occur with little warning at any time along the x-axis, when the NVMDs of the server memory card have no erased blocks available. Moreover during the low performance portion 618 of the curve, no write operations may be allowed in the NVMDs until memory capacity is available. Additionally, it is not clear how much time along portion 618 of the graph is needed to reach the point of recovered performance 616. Nor is it clear how long a recovered performance portion 619 will last. Without background garbage collection, the write performance into NVMDs of a server memory card cannot be sustained at a desired level.

Write operation performance into the NVMDs of a server memory card is predictable and sustainable with background garbage collection. When empty, the initial performance of the NVMDs is at the high performance portion 612 of the graph 620. As the memory capacity of the NVMDs begin to get filled, a slow degradation portion 621 occurs along the graph 620 until reaching a sustainable portion 622 of the graph. The write operation performance reaches a sustainable performance level 625 with background garbage collection so that write operations can continue into the NVMDs over time.

To provide sustained performance, a monitoring operation is also performed. The native flash interface is monitored on a per channel basis for the number of read operations per channel, the number of write operations per channel, and/or the number of erase operations per channel. Adaptable boundary conditions may be provided of a maximum and minimum threshold of operations to bound the write operation performance as tight as possible. In case the amount of free space needs to be increased, the boundaries may be lowered to reduce the foreground write operation performance and simultaneously increase garbage collection activity. Furthermore, the background garbage collection operation (reclamation) is to be synchronized with a foreground garbage collection operation.

The foreground garbage collection operation is a synchronization of application-level write requests and meta-data requests with background garbage collection competing for resources. Application-level write requests and meta-data requests need to be synchronized with the background garbage collection activity to make sure that we do not end up consuming more space than is being recreated.

Broadly speaking, background garbage collection is either inactive or active. Furthermore, when background garbage collection is active, it can be either unsynchronized with foreground write activity, or synchronized with the foreground write activity.

When free space drops below a first threshold, background garbage collection is activated. This garbage collection is unsynchronized with foreground activity, proceeding at a constant rate, with foreground activity taking precedence.

When free space drops below a second threshold, background garbage collection becomes synchronized with foreground activity. Synchronization between this form of garbage collection, also referred to as foreground garbage collection, and application write requests is achieved through a credit scheme—ensuring that free space consumption does not race ahead of free space creation.

One switches back into unsynchronized mode when free space reserve exceeds a third threshold. When free space reserve exceeds a fourth threshold, background garbage collection is turned off. In this case, garbage collection may be turned on and off to synchronize background and foreground garbage collection operations.

Methods of Garbage Collection

Figure 11:
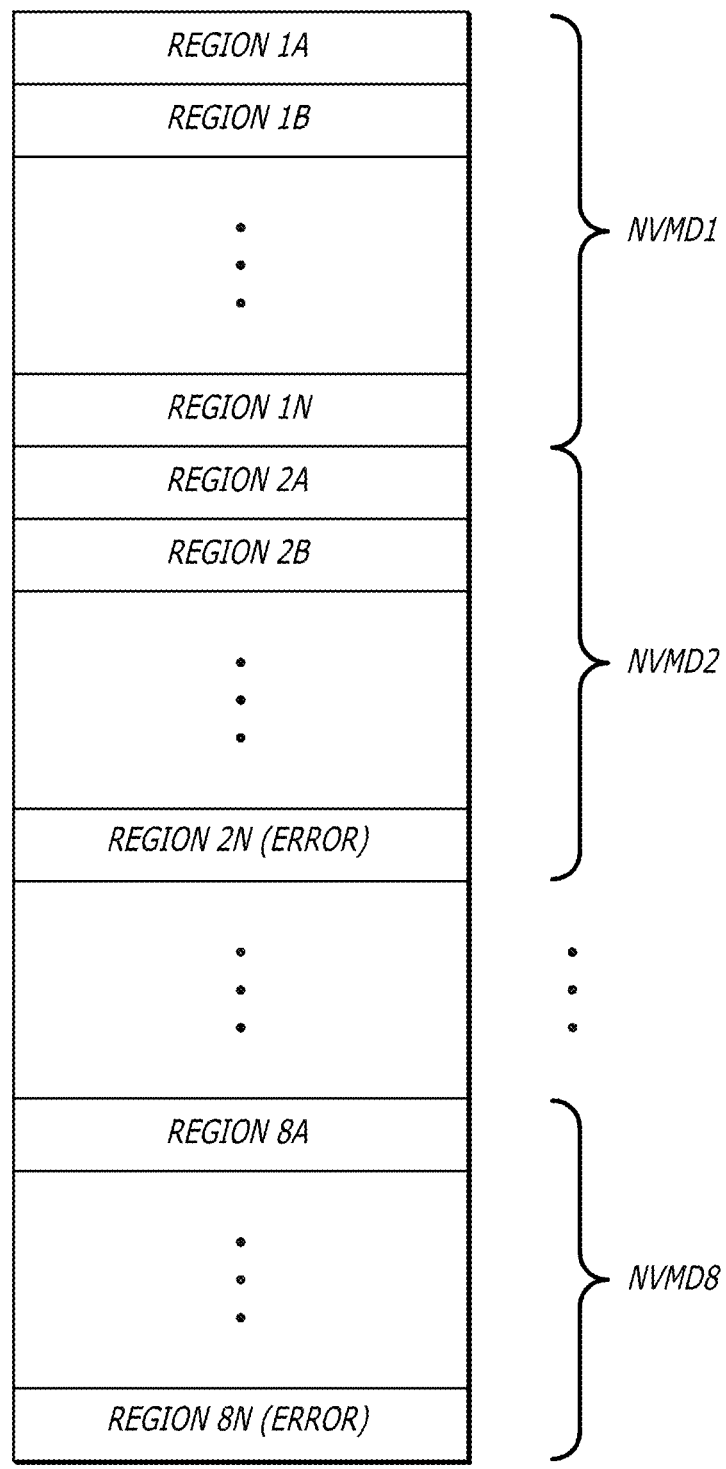
FIG. 11 illustrates regions of non-volatile memory devices (NVMDs) of a server memory card.

Referring now to FIG. 11, memory regions of NVMD1 through NMVD8 are collected together for a given server memory card in accordance with one embodiment of the invention. In other embodiments, memory regions may be defined by tying together (striping) corresponding address regions across multiple NVMDs. The number of NVMDs tied together may vary from as few as two to as many as eight.

Not all regions of NVMDs are candidates for garbage collection. Some regions are better candidates for garbage collection than others.

By default, memory regions with the highest invalid-to-valid ratio are selected for garbage collection. For example, region 1N in FIG. 11 may have all but two write pages invalid and is selected for garbage collection. These regions yield the maximal reclamation with the least amount of relocation, and hence least perturbation to foreground performance. Additionally, regions that have seen more than a threshold of read accesses or not seen a read access for more than a certain amount of time are picked for collection. For example, region 2N in FIG. 11 may have not been accessed for more than 24 hours and is selected for garbage collection. The rationale for selecting regions to garbage collect based on the threshold of read accesses is to prevent possibility of increasing bit errors because of a read disturb phenomenon (an error mode in NAND where multiple reads to the same memory location degrade the information stored in the location), while that of selecting regions to garbage collect based on how much time has elapsed since a location in the region was last accessed is to make sure that we don't exceed the retention capability of a memory cell and to ensure that all regions in the device are wearing uniformly. Finally, regions are also picked based on the nature and number of errors encountered during accesses to that region. A region exhibiting a number of soft errors may be preferentially picked for garbage collection to allow the region to be scrubbed and placed back into service with higher reliability. For example, region 8N in FIG. 11 may be error prone and scrubbed by garbage collection.

The memory capacity of the nonvolatile memory provided by each server card is monitored to determine a ratio of the currently used capacity (CUC) of the server card to the total available capacity (TAC) of the server card. This ratio, CUC/TAC, may be used to trigger various garbage collection activity or modes.

Figure 10:
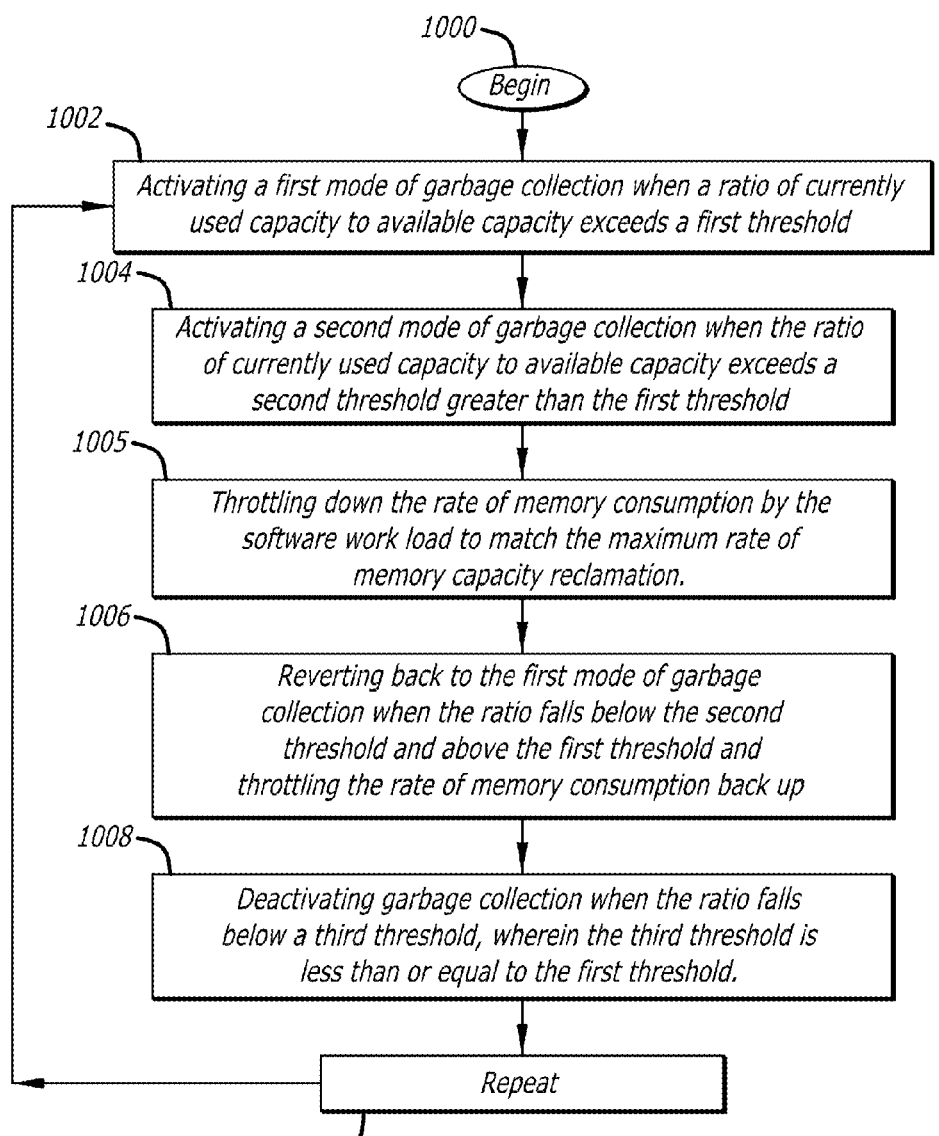
FIG. 10 illustrates a flow chart of a method for garbage collection to reclaim memory capacity in the non-volatile memory devices.

Referring now to FIG. 10, a method for garbage collection in a non-volatile memory system is now described. The method of garbage collection may be performed for each server card. The method begins at process block 1000 and then goes to process block 1002.

At process block 1002, a first mode of garbage collection is activated when a ratio of currently used capacity to available capacity (CUC/TAC) exceeds (or falls below) a first threshold. The first mode of garbage collection may reclaim memory capacity at a constant rate that is independent of the rate of memory consumption by the operating system or application software work load. The process then goes to process block 1004.

At process block 1004, a second mode of garbage collection is activated when the ratio of currently used capacity to available capacity (CUC/TAC) exceeds (or falls below) a second threshold greater (or less) than the first threshold. The second mode of garbage collection may reclaim memory capacity at a rate that is adapted to the rate of memory consumption by the software work load. If the second mode of garbage collection reclaims memory capacity at a maximum rate, the process may go to process block 1005. If not, the process may go to process block 1006.

At process block 1005, the rate of memory consumption by the operating system or application software work load may be throttled down to match the maximum rate of memory capacity reclamation so that the server card memory capacity is maintained. The process then goes to process block 1006.

At process block 1006, garbage collection reverts back to the first mode when the ratio falls below (or rises above) the second threshold but remains above (or remains below) the first threshold. The rate of memory consumption may be slowly throttled back up as well. The process then goes to process block 1008.

At process block 1008, garbage collection may be deactivated when the CUC/TAC ratio falls below (or rises above) a third threshold. The third threshold may be less than or equal to the first threshold. The process then goes to process block 1010 and returns to process block 1002 to repeat the processes as needed.

Figure 7:
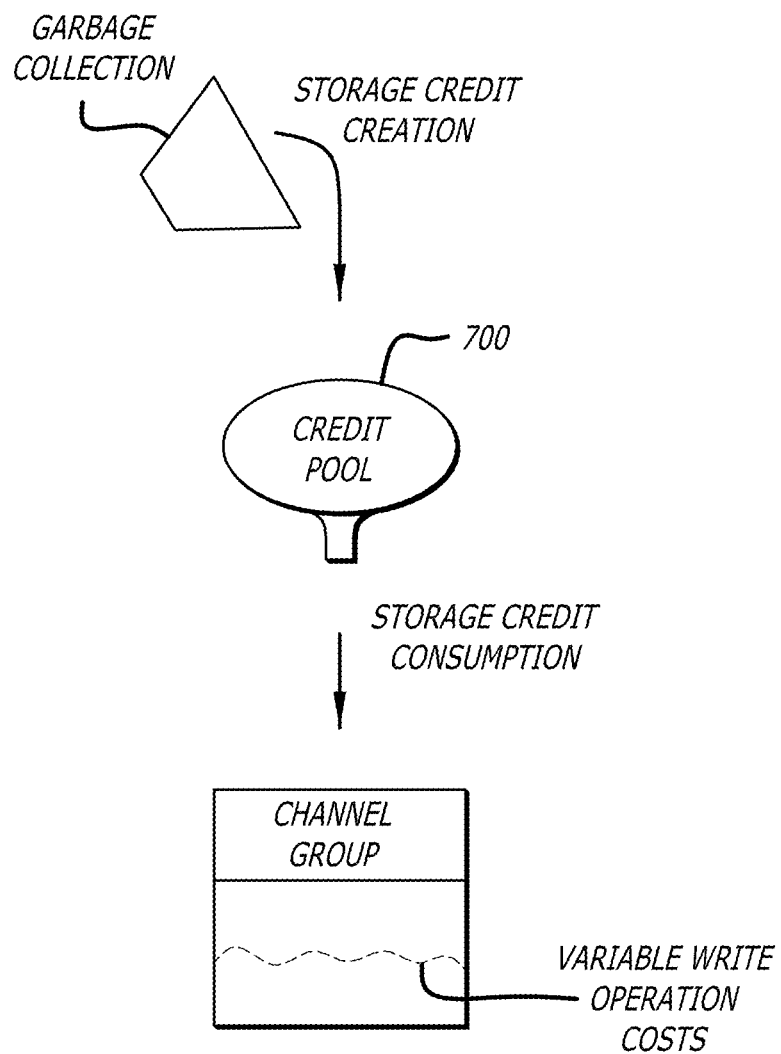
FIG. 7 illustrates a diagram of the function of a credit pool to match a memory capacity reclamation rate with a memory capacity utilization rate.
Figure 8:
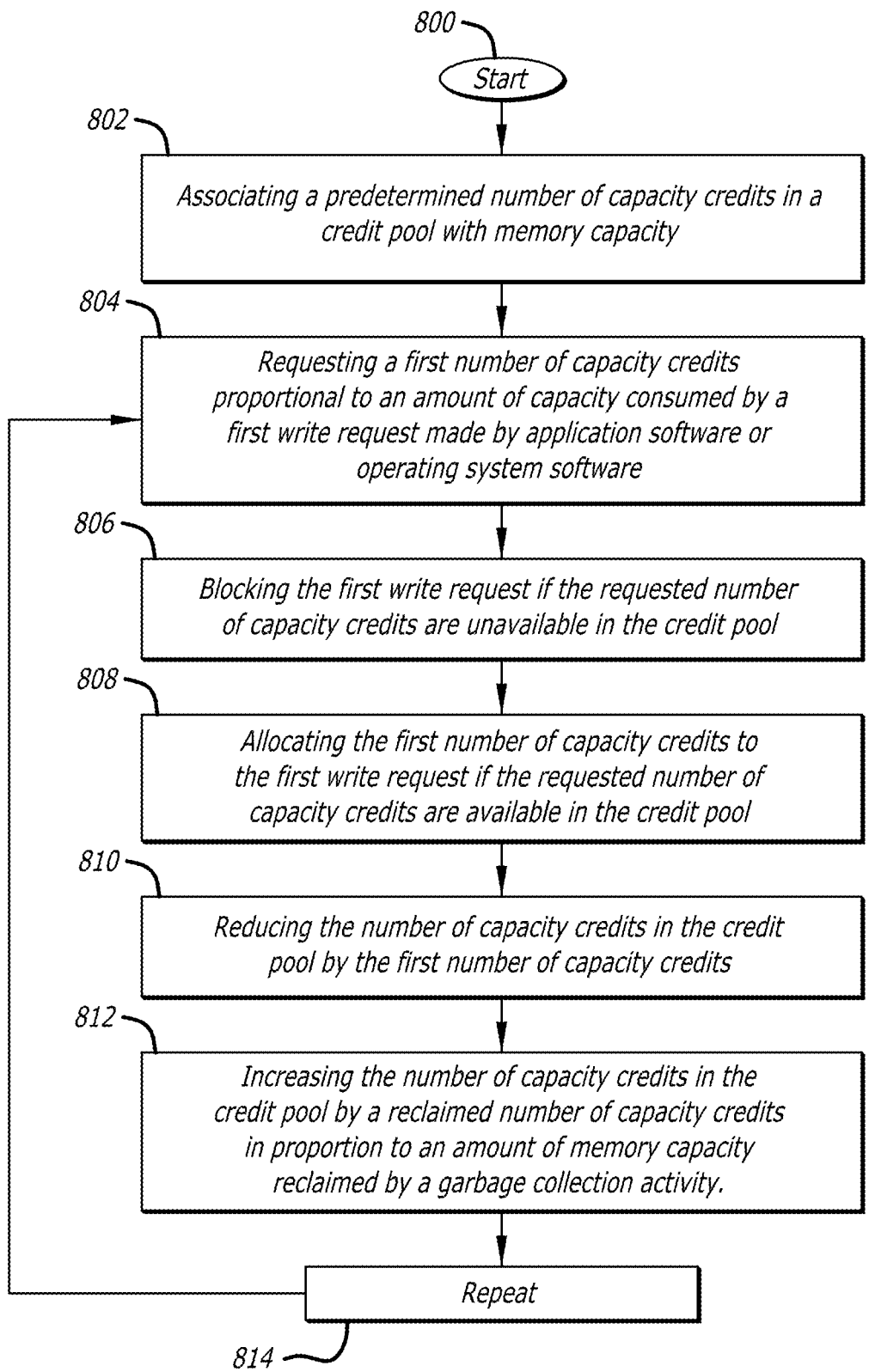
FIG. 8 illustrates a flow chart of a method for matching a memory capacity reclamation rate with a memory capacity utilization rate.

Referring now to FIGS. 7 and 8, a credit pool 700 may be used to match a memory capacity utilization rate (MCUR) to a memory capacity reclamation rate (MCRR). Memory capacity credits (MCC) may be used to match the MCUR to the MCRR.

The method of matching the MCUR to the MCRR begins with process block 800 and then goes to process block 802.

At process block 802, a predetermined number of capacity credits in the credit pool 700 are associated with the available memory capacity. This is an initial starting point. The process then goes to process block 804.

At process block 804, a first number of capacity credits proportional to an amount of capacity consumed by a first write request made by application software or operating system software are requested from the pool 700. The channels of a server memory card are grouped together so that this request is made collectively per server memory card. The process then goes to process block 806.

At process block 806, the first write request is blocked if the requested number of capacity credits are unavailable in the credit pool 700. In this case the request is too large presently and must be held until sufficient capacity is available. The process then goes to process block 808.

At process block 808, the first number of capacity credits are allocated to the first write request if the requested number of capacity credits are available in the credit pool 700. The process then goes to process block 810.

At process block 810, the number of capacity credits in the credit pool 700 is reduced by the first number of capacity credits. The credit pool is drained of the capacity credits being consumed. The process then goes to process block 812.

At process block 812, the number of capacity credits are increased in the credit pool by a reclaimed number of capacity credits. The reclaimed number of capacity credits is in proportion to an amount of memory capacity reclaimed by the garbage collection activity. The proportion used to compute the reclaimed number of capacity credits may periodically vary depending upon the circumstances surrounding the garbage collection and the memory utilization. The process then goes to process block 814.

At process block 814, the process goes back to process block 804 to process the next write request. That is, the requesting, the blocking, the allocating, the reducing, and the increasing processes are repeatedly performed to match a memory capacity utilization rate to a memory capacity reclamation rate. The garbage collection activity continuously adapts the reclaimed number of capacity credits to match the requested number of capacity credits by the application software work load.

Figure 9:
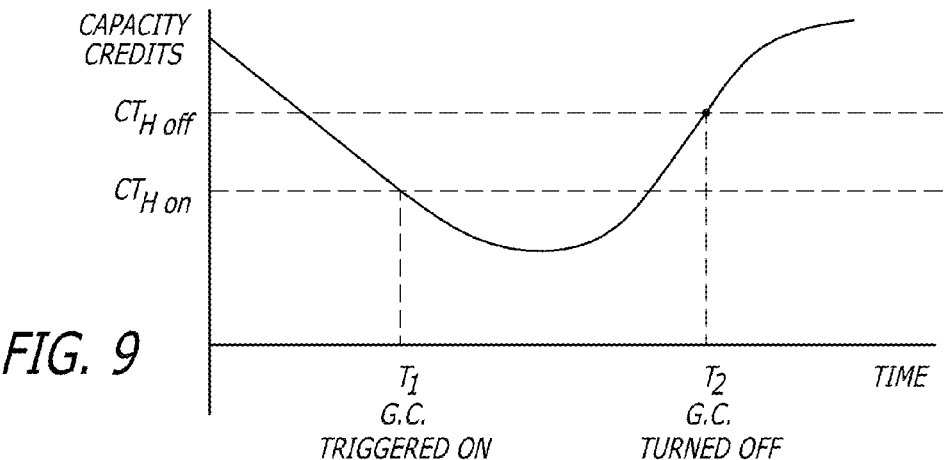
FIG. 9 illustrates a diagram of an exemplary chart of memory capacity credits in a credit pool and a pair of thresholds being used to turn garbage collection on and off.

In FIG. 9, an exemplary graph of capacity credits is illustrated. The predetermined number of capacity credits in the credit pool is selected to be between a credit threshold on ($CT_{H\ on}$) and a credit threshold off ($CT_{H\ off}$) to maximize average write performance (e.g., throughput) while minimizing variations in write performance. As capacity credits are drained from the credit pool, the curve crosses over the credit threshold on $CT_{H\ on}$ at time T1 triggering the garbage collection requests to be issued (G.C. Triggered On). The garbage collection generates capacity credits that are poured back into the credit pool to slow the reduction in capacity credits. The number of capacity credits in the pool begins to increase from the additional garbage collection so that it becomes greater than the credit threshold off $CH_{H\ off}$ at time T2 to turn off garbage collection (G.C. Turned Off). The credit threshold on $CT_{H\ on}$, for example, may be set to be proportional to ten percent of the total memory capacity while the credit threshold off $CH_{H\ off}$ may be set to be proportional to twenty percent of the total memory capacity.

The credit thresholds ($CT_{H\ off}$ and $CT_{H\ on}$) may be adjusted to minimize variations in the write performance by being set to minimize a number of times the write performance oscillates from above the average write performance to below the average write performance and minimize a difference between minimum write performance and maximum write performance.

For example, if one finds that the garbage collection activity is not triggered for a certain number of time periods, it is assumed that the workload does not require an active rate of garbage collection, so the credit threshold on $CT_{H\ on}$ and credit threshold off $CT_{H\ off}$ are adjusted downwards. Similarly, if one finds that the application workload is blocked one or more times because of unavailability of capacity credits over a certain number of time periods, it is assumed that the workload requires garbage collection to proceed at a faster rate than the current one, so the credit threshold on and credit threshold off are adjusted upwards to start garbage collection early and make it run for a longer period.

The setting of the capacity credits in the credit pool also influences the rate at which garbage collection is performed. The higher the number of capacity credits, the higher the rate of garbage collection and vice versa.

CONCLUSION

Aspects of embodiments of the invention are thus described. Aspects of the invention may be implemented in a system using software and/or hardware. For example, a system may include one or more processors that execute instructions of software to implement an aspect of the invention. A process may be performed by instructions with a processor.

When implemented in software, the elements of the embodiments of the invention are essentially the code segments or instructions to perform the necessary tasks. The program or code segments can be stored in a processor readable medium. The processor readable medium may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, or other type of storage device. The code segments or instructions may be remotely stored and downloaded in a data signal via computer networks such as the Internet, Intranet, etc. over a fiber optic medium, a radio frequency (RF) link, or other transmission medium for execution by a processor.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The embodiments of the invention should be construed according to the claims that follow below.

What is claimed is:

1. A method of matching a memory capacity utilization rate to a memory capacity reclamation rate for a non-volatile memory system, the method comprising:
   a) associating a predetermined number of capacity credits in a credit pool with a total memory capacity of the non-volatile memory system;
   b) requesting a first number of capacity credits proportional to an amount of memory capacity that is to be consumed by a first write request made by application software or operating system software;

c) blocking the first write request if the first number of capacity credits are unavailable in the credit pool;

d) allocating the first number of capacity credits to the first write request if the first number of capacity credits are available in the credit pool;

e) reducing the number of capacity credits in the credit pool by the first number of capacity credits; and f) increasing the number of capacity credits in the credit pool by a reclaimed number of capacity credits in proportion to an amount of memory capacity reclaimed by a garbage collection activity, wherein the garbage collection activity can throttle a memory capacity utilization rate in order to match a memory capacity reclamation rate.

2. The method of claim 1, wherein
the requesting, the blocking, the allocating, the reducing, and the increasing is repeatedly performed to match the memory capacity utilization rate to the memory capacity reclamation rate.

3. The method of claim 2, wherein
the garbage collection activity continuously adapts the reclaimed number of capacity credits to match the requested number of capacity credits by the application software work load.

4. The method of claim 2, wherein
the predetermined number of capacity credits in the credit pool is selected between a first threshold and a second threshold to maximize average write performance (e.g., throughput) while minimizing variation in write performance.

5. The method of claim 4, wherein
the minimizing of the variation of write performance includes
minimizing a number of times the write performance oscillates from above the average write performance to below the average write performance; and
minimizing a difference between minimum write performance and maximum write performance.

6. The method of claim 1, wherein
one or more of the associating, the requesting, the blocking, the allocating, the reducing, and the increasing is performed with a processor.

* * * * *